US012032152B1

(12) United States Patent
Melochick et al.

(10) Patent No.: US 12,032,152 B1
(45) Date of Patent: Jul. 9, 2024

(54) ARTICULATING BRIDGE SYSTEM FOR PANORAMIC NIGHT VISION DEVICES

(71) Applicants: Jeffery Melochick, Raymond, NH (US); Nicholas Berube, Methuen, MA (US)

(72) Inventors: Jeffery Melochick, Raymond, NH (US); Nicholas Berube, Methuen, MA (US)

(73) Assignee: Nocturn Industries LLC, Exeter, NH (US)

( * ) Notice: Subject to any disclaimer, the term of this patent is extended or adjusted under 35 U.S.C. 154(b) by 0 days.

(21) Appl. No.: 18/198,251

(22) Filed: May 16, 2023

(51) Int. Cl.
  *G02B 23/18* (2006.01)
  *G02B 23/12* (2006.01)

(52) U.S. Cl.
  CPC .......... *G02B 23/18* (2013.01); *G02B 23/125* (2013.01)

(58) Field of Classification Search
  CPC .............................. G02B 23/18; G02B 23/125
  See application file for complete search history.

(56) References Cited

U.S. PATENT DOCUMENTS

| | | | |
|---|---|---|---|
| 6,462,867 B2 | 10/2002 | Choinere | |
| 8,269,159 B2 | 9/2012 | Filipovich et al. | |
| 2004/0238724 A1* | 12/2004 | Moody | G02B 23/12 250/207 |
| 2014/0327962 A1* | 11/2014 | Teetzel | G02B 23/125 359/409 |
| 2019/0025567 A1* | 1/2019 | Lasky | A42B 3/042 |
| 2022/0167703 A1* | 6/2022 | Brace | G02B 23/125 |

* cited by examiner

*Primary Examiner* — Thanh Luu
(74) *Attorney, Agent, or Firm* — Dan B Law PLLC; Daniel S. Bretzius

(57) ABSTRACT

Disclosed is a panoramic night vision system having an articulating bridge system having two independently rotatable hinges and tube subassemblies that rotate to bring the sides of the subassemblies towards the center of the panoramic night vision system and above the users eyes for protection of the subassemblies and increased user experience. Implementing the articulating bridge system permits independent actuation of panoramic subassemblies and provides three stowed positions.

1 Claim, 32 Drawing Sheets

ARTICULATING BRIDGE SYSTEM FOR PANORAMIC NIGHT VISION DEVICES

FIELD OF DISCLOSURE

The present disclosure relates to systems used to permit users to see in evening, night, and low light conditions. In some embodiments, the disclosure relates to an articulating bridge system for panoramic night vision systems that are adapted and/or configured to be worn on or secured to a user's head or helmet.

BACKGROUND

Night vision systems have been in use since World War II, but have seen more interest and use from civilians with increased availability of recreational, sport, and entertainment activities that can be conducted at night. Night vision systems can come in many different varieties, styles, and mounts. Night vision systems that are worn on a user's head or helmet must be lightweight and appropriately configured to provide ease of use and prevent instability during use.

This is particularly true in a military or law enforcement applications where the user's safety and life are at risk. Rapid, effective, and ergonomic use, along with low system weight are critical attributes in scenarios requiring quick traction, high dexterity, ease of use, and long term use with low fatigue.

SUMMARY

As shown and described herein, this disclosure describes and illustrates improvements to panoramic night vision systems. Some improvements disclosed herein include an articulating bridge with independent rotation and better stowability. By way of example, the present disclosure describes embodiments having two hinges disposed to permit independent and better stowability of separate panoramic subassemblies. The improvements and inventions discussed herein provide a better user experience and increase enjoyment and use of the panoramic night vision systems.

Additional advantages and details are also described herein with reference to the provided drawings. Some embodiments of panoramic night vision systems may incorporate only one of the improvements discussed herein, while other embodiments may include a combination of such improvements. Embodiments of the panoramic night vision system are not restricted to the examples illustrated in the drawings, as, due to the number of possible embodiments, only some embodiments can be shown in the figures.

BRIEF DESCRIPTION OF THE DRAWINGS

The disclosure below is made with reference to the drawings, in which.

DETAILED DESCRIPTION

Night vision systems come in several formats, including the well-known binocular format having two imaging tubes. In some scenarios, users of night vision systems may desire to have a wider field of view than that offered by the typical binocular format. Such users would instead prefer a "quad" night vision system, also known as a panoramic night vision system.

Figure 1:
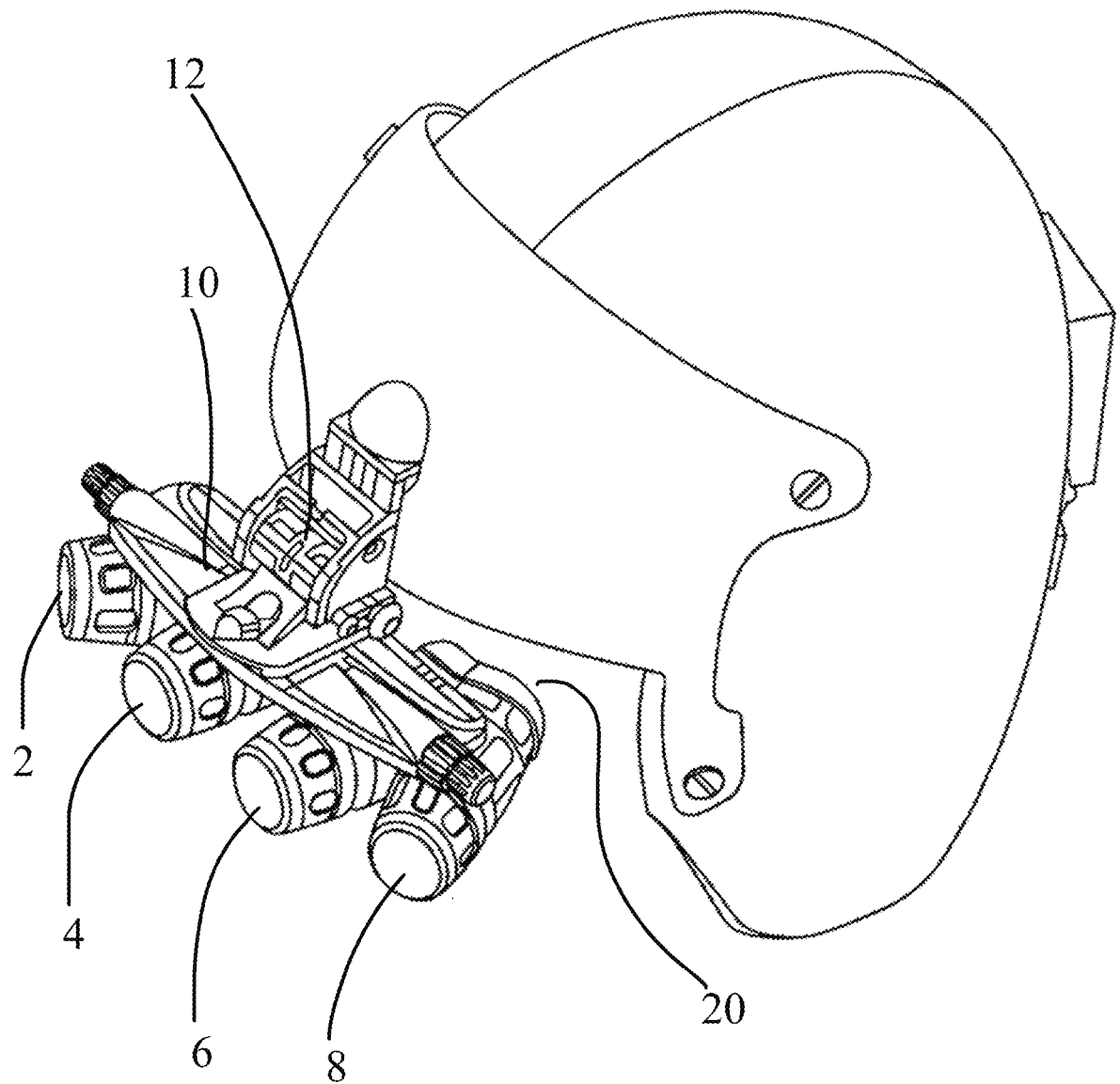
FIG. 1 is a front perspective view of a prior art panoramic night vision system.

FIG. 1 shows a front perspective view of a prior art embodiment of a panoramic night vision system. With reference to the prior art shown in FIG. 1, a typical panoramic night vision system includes four imaging tubes 2, 4, 6, 8. The inner tubes 4, 6 point substantially forward, to provide a range of view similar to typical binoculars. The outer tubes 2, 8 are positioned outward, to provide an increased field of view over typical binoculars. When the user places their eyes towards the four tubes, the night vision system will provide a panoramic view to the user.

With continued reference to FIG. 1, the four tubes may exist in two subassemblies. For example, tubes 2 and 4 can be included in a first subassembly and tubes 6 and 8 may be included in a second subassembly. As shown in FIG. 1, where two subassemblies exist in the prior art, they are both attached to a single stiff, rigid mounting plate 10.

Figure 2:
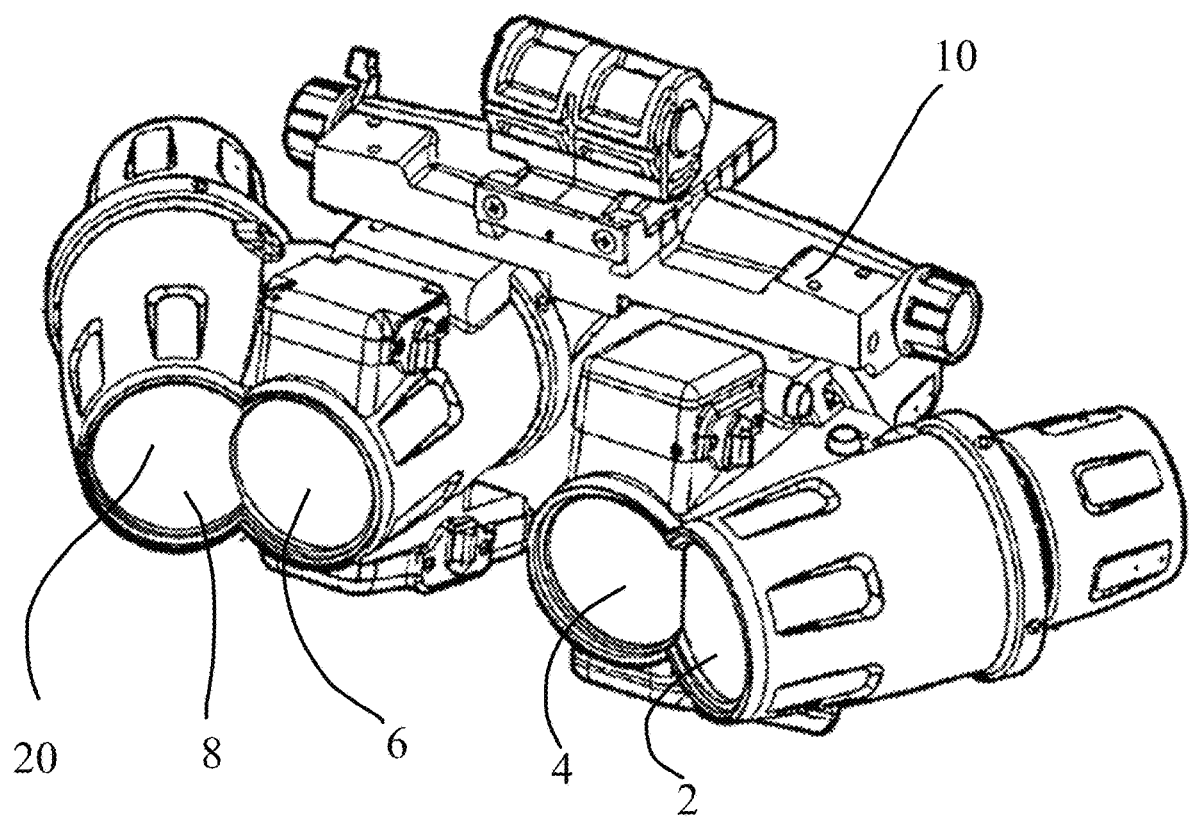
FIG. 2 is a rear perspective view of a prior art panoramic night vision system.

For most users, the panoramic night vision system is further attached to a visor or helmet. This type of attachment allows a user to conveniently carry the system in a hands-free manner. Users of a panoramic night vision system may desire to use the system at certain times and not use it at other times. Because removal of the entire panoramic system from the user's visor or helmet can be cumbersome and time consuming, prior panoramic night vision systems were configured to permit upward rotation of the assembly, to simultaneously move both subassemblies out of the user's line of vision when not in use. As shown in FIG. 1, traditional night vision systems include a single hinge 12 coupled to a single mount 10, to permit all four tubes 2, 4, 6, 8 to rotate upward from front to back, towards a vertical axis, such that the eyepieces of the tubes (e.g. eyepiece 20) transition from a first orientation where the eyepiece 20 faces a user's eye to a second orientation where the eyepiece 20 faces the ground. This type of rotation causes the tubes 2, 4, 6, 8 to always remain laterally disposed to one another, and always provides only a lateral panoramic view. FIG. 2 shows a back view of another embodiment of a prior art panoramic night vision system that may also be referenced with regards to the composition and structure of prior art embodiments with the rigid mounting plate 10.

The panoramic systems shown in FIGS. 3 through 32 seek to improve upon the traditional configuration of panoramic night vision systems. Like the prior art, the panoramic system shown in the front perspective view of FIG. 3 include four tubes 2, 4, 6, 8, that are sectioned into two subassemblies. However, the present system does not include a single rigid mount 10, nor does it only facilitate rotation upward from front to back towards a vertical axis to permit stowing of the tube subassemblies in an upright manner, with an eyepiece pointing downward.

Figure 3:
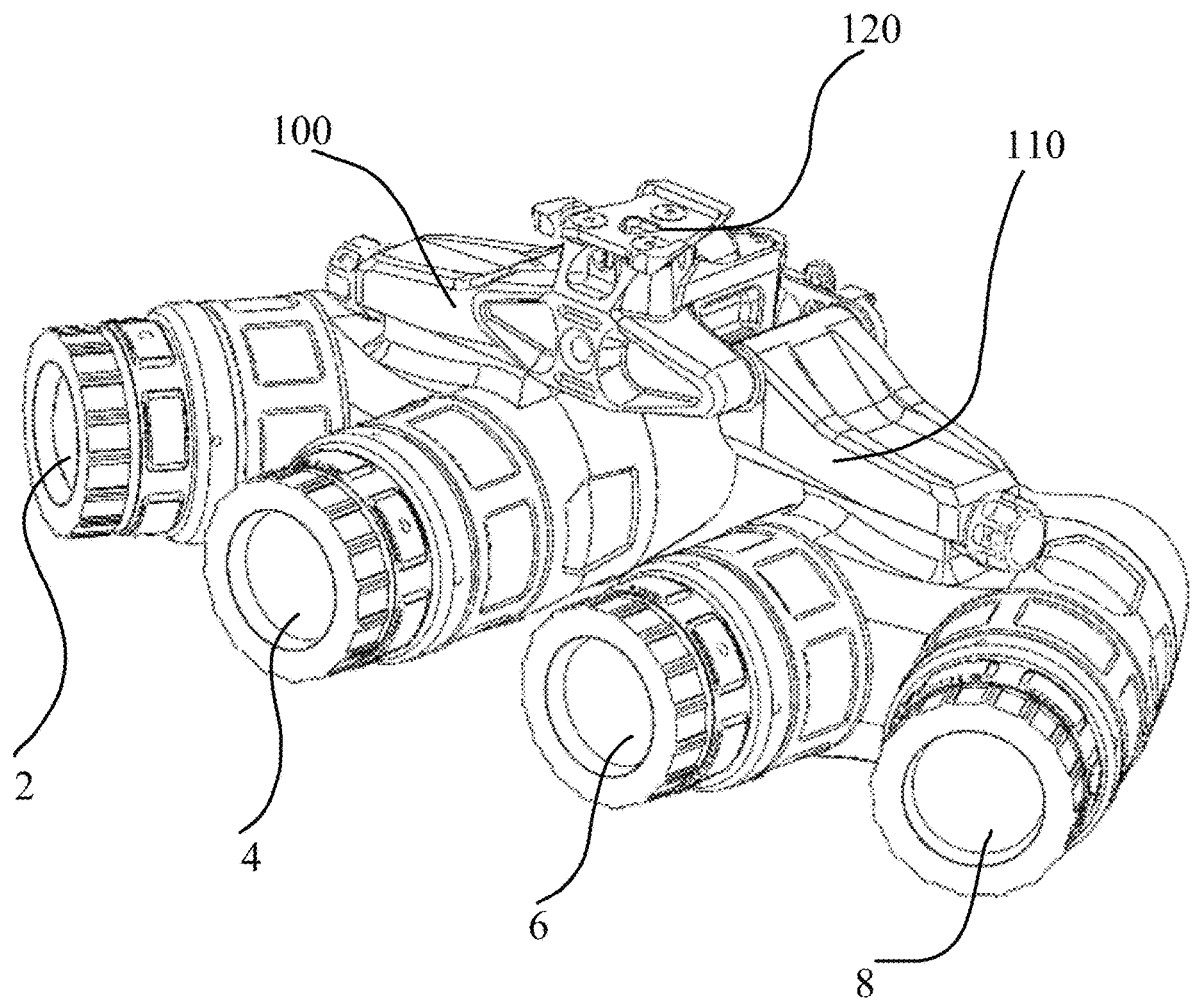
FIG. 3 is a front perspective view of an embodiment of the present panoramic night vision system with both tube subassemblies deployed.
Figure 4:
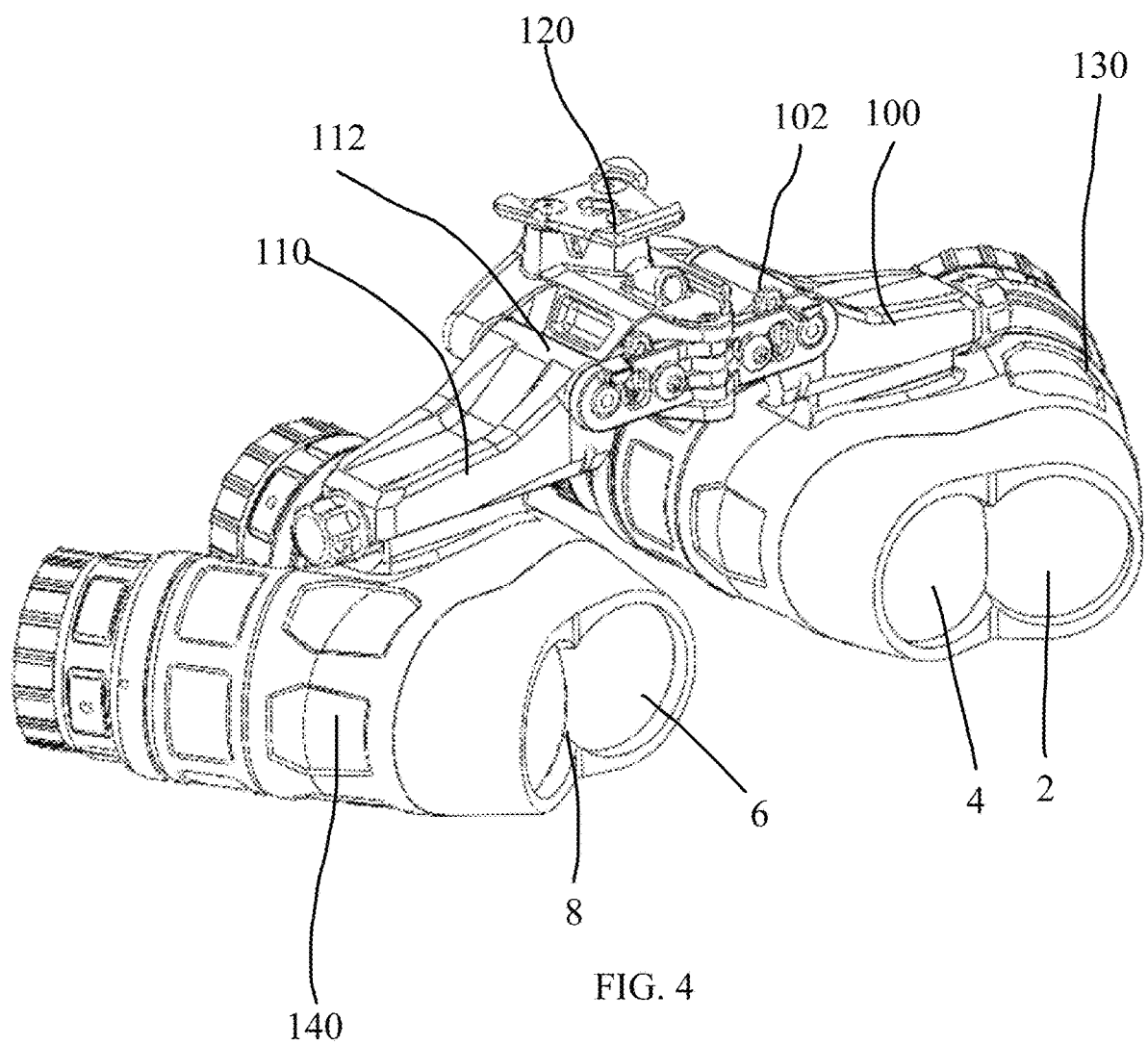
FIG. 4 is a rear perspective view of an embodiment of the present panoramic night vision system with both tube subassemblies deployed.
Figure 5:
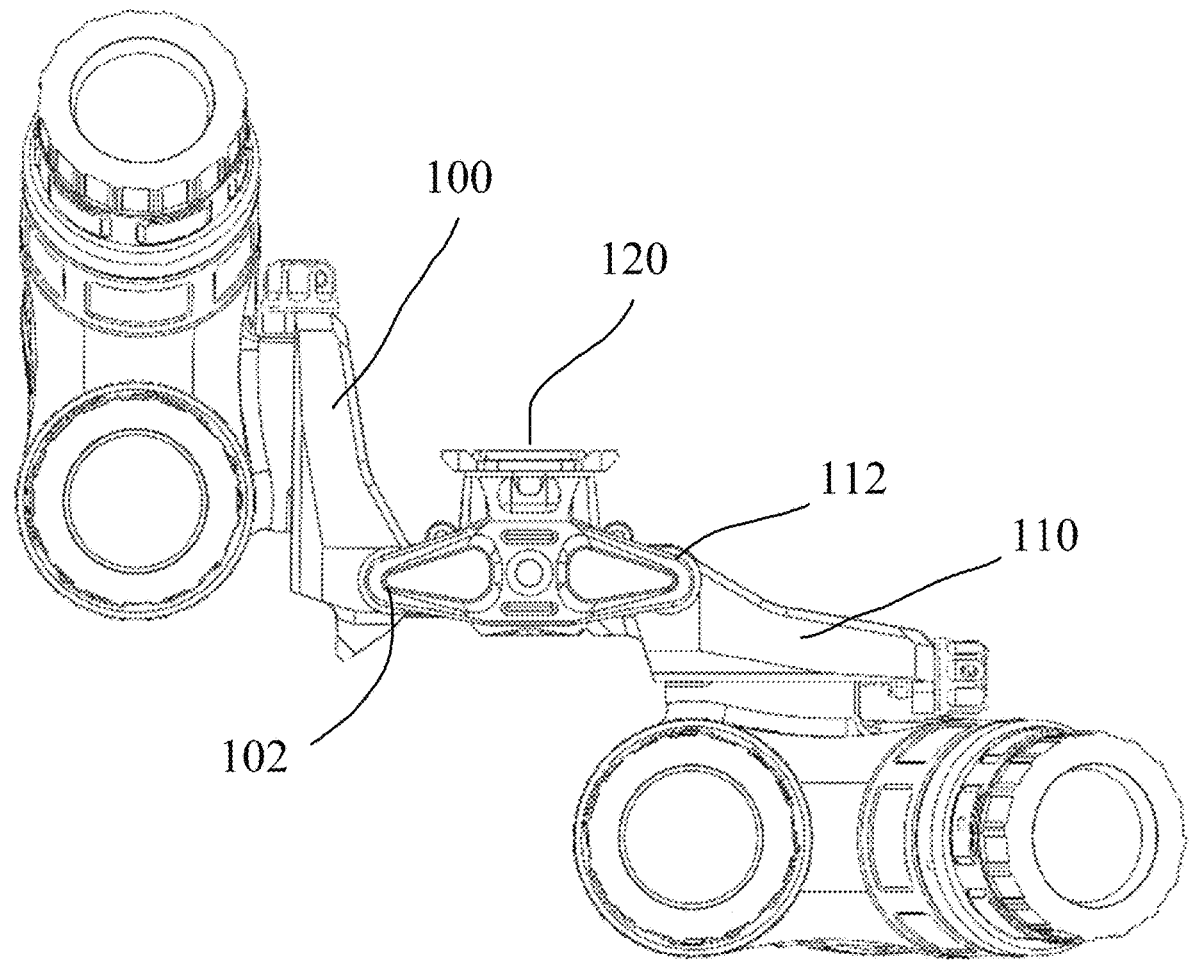
FIG. 5 is a front view of an embodiment of the present panoramic night vision system with one tube subassembly deployed and one tube subassembly stowed.
Figure 6:
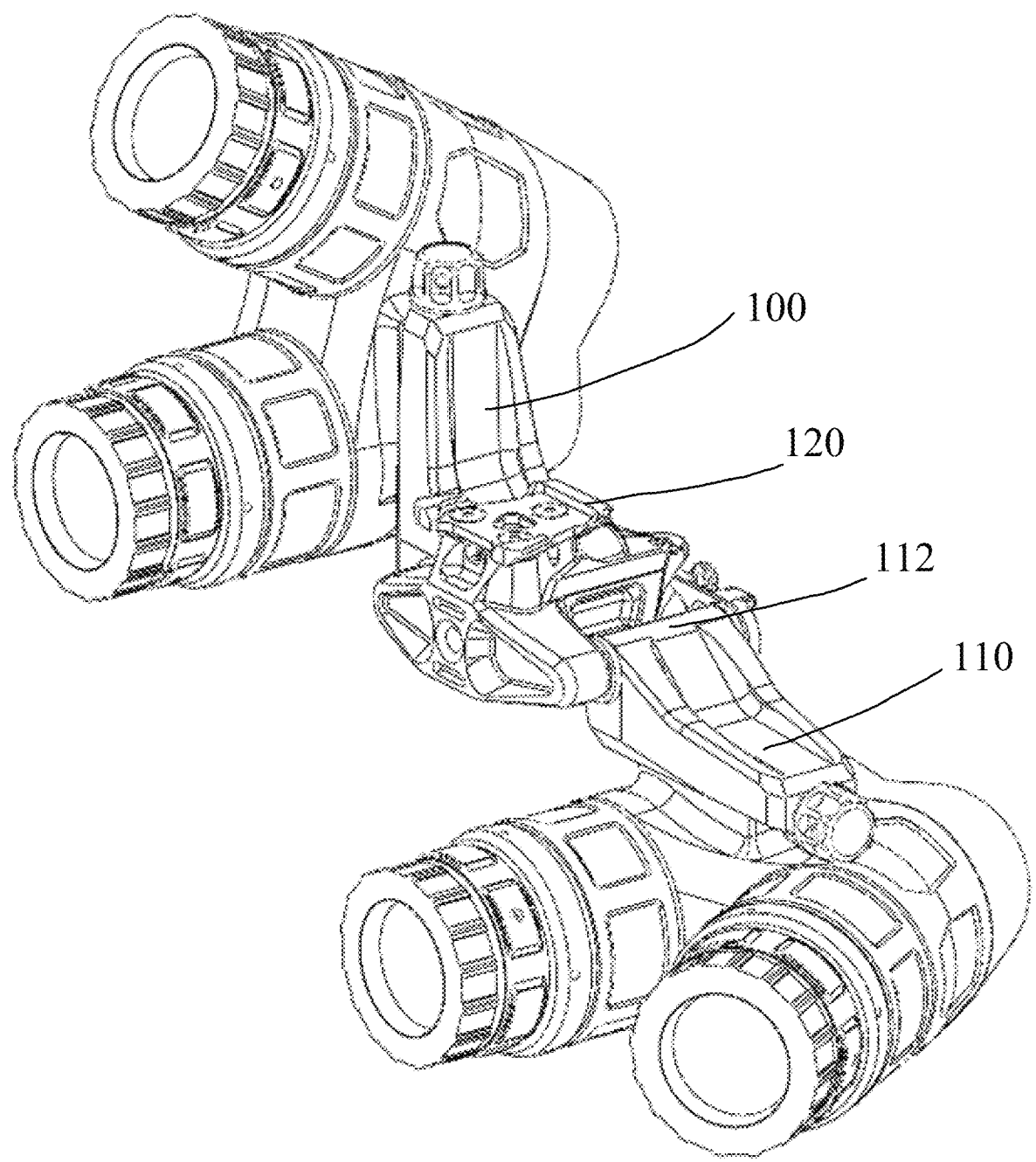
FIG. 6 is a front perspective view of an embodiment of the present panoramic night vision system with one tube subassembly deployed and one tube subassembly stowed.
Figure 7:
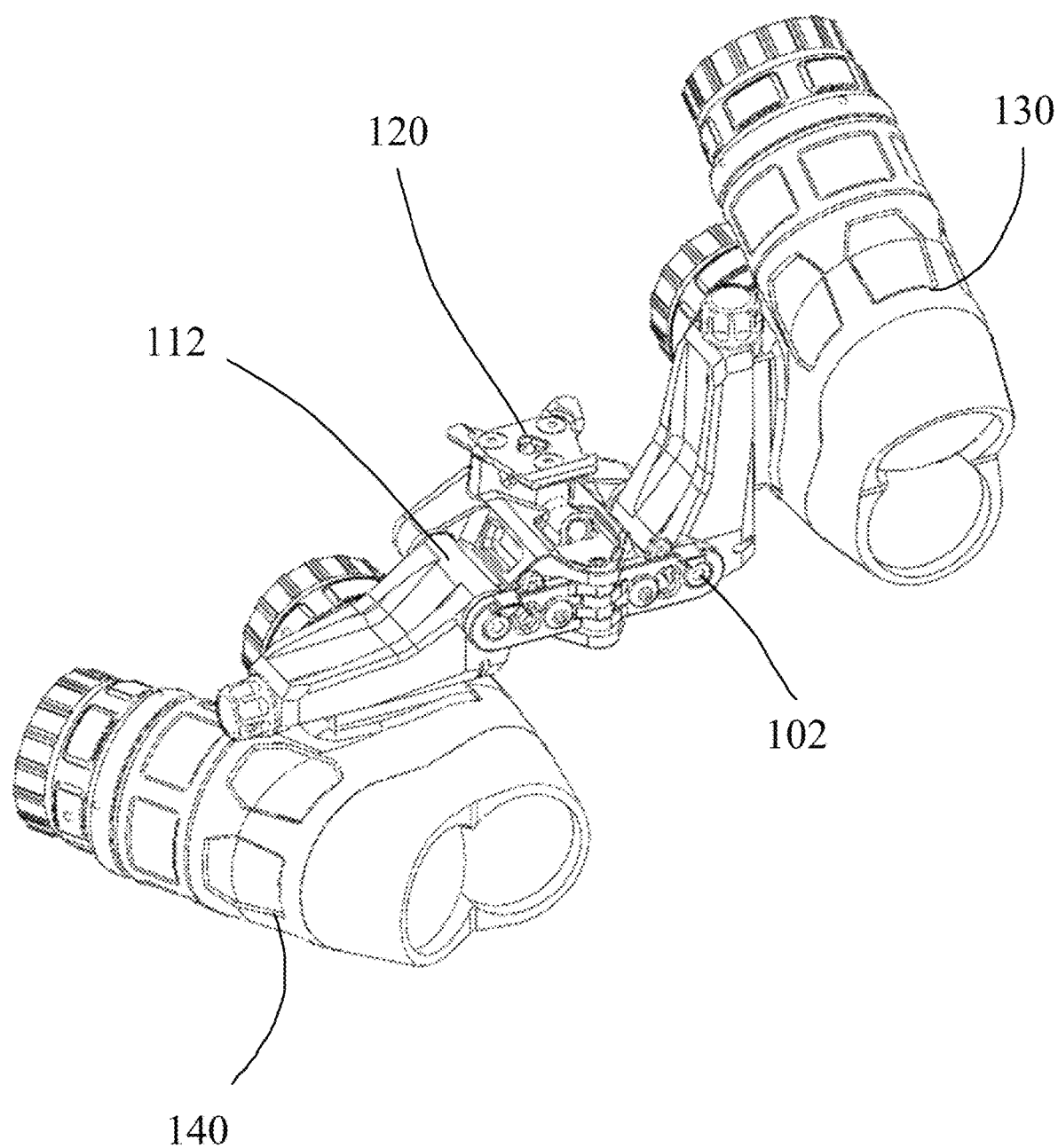
FIG. 7 is a rear perspective view of an embodiment of the present panoramic night vision system with one tube subassembly deployed and one tube subassembly stowed.
Figure 8:
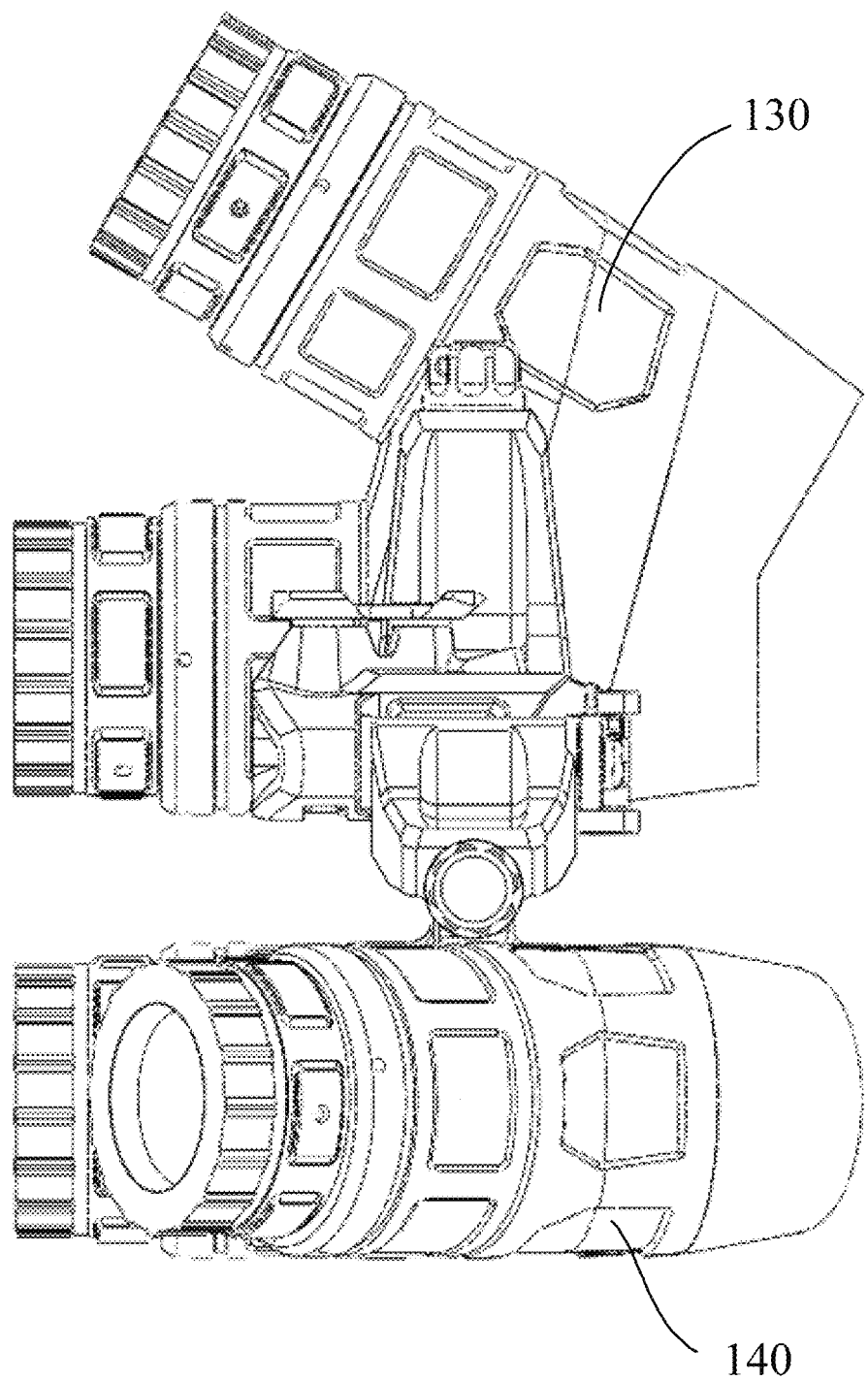
FIG. 8 is a side perspective view of an embodiment of the present panoramic night vision system with one tube subassembly deployed and one tube subassembly stowed.
Figure 9:
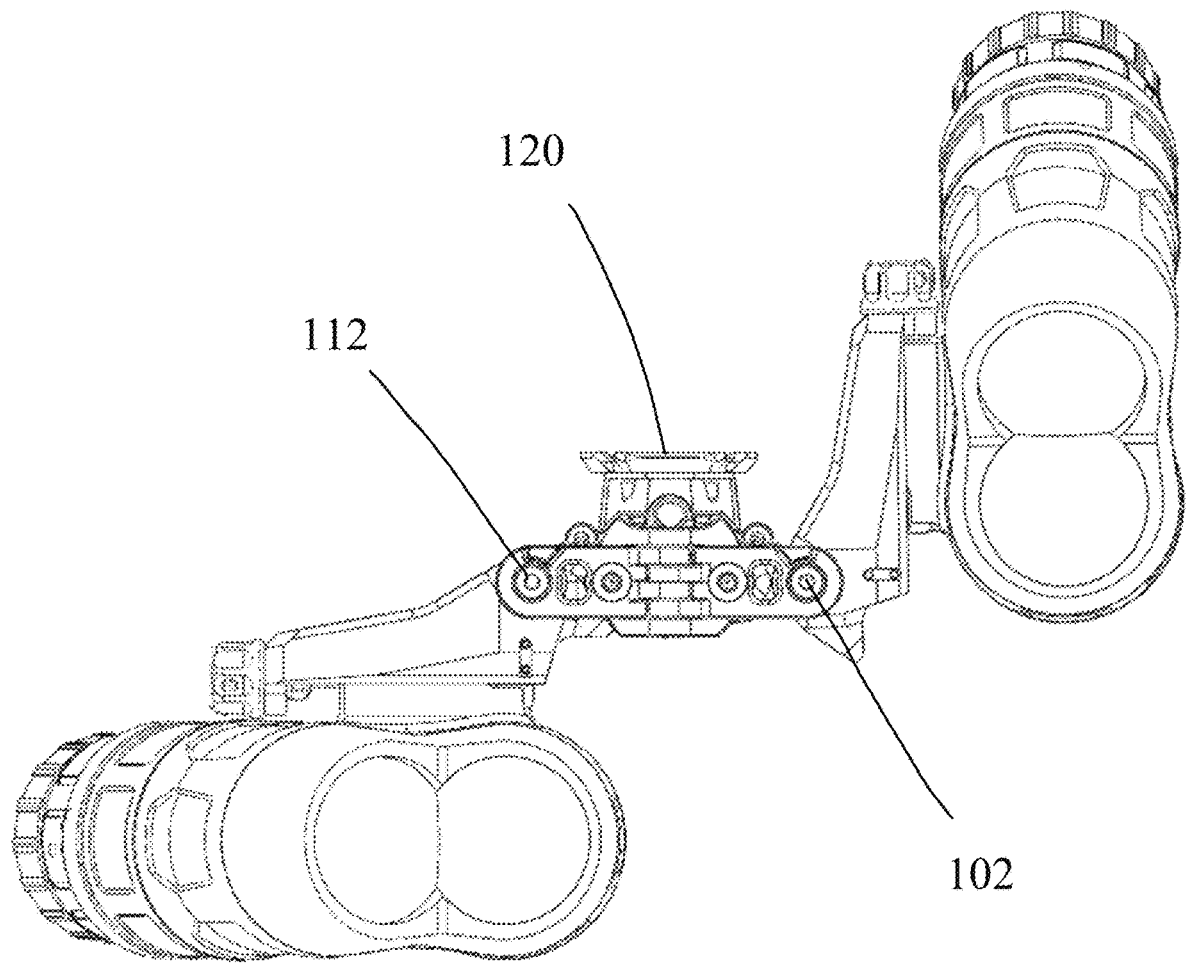
FIG. 9 is a rear view of an embodiment of the present panoramic night vision system with one tube subassembly deployed and one tube subassembly stowed.
Figure 10:
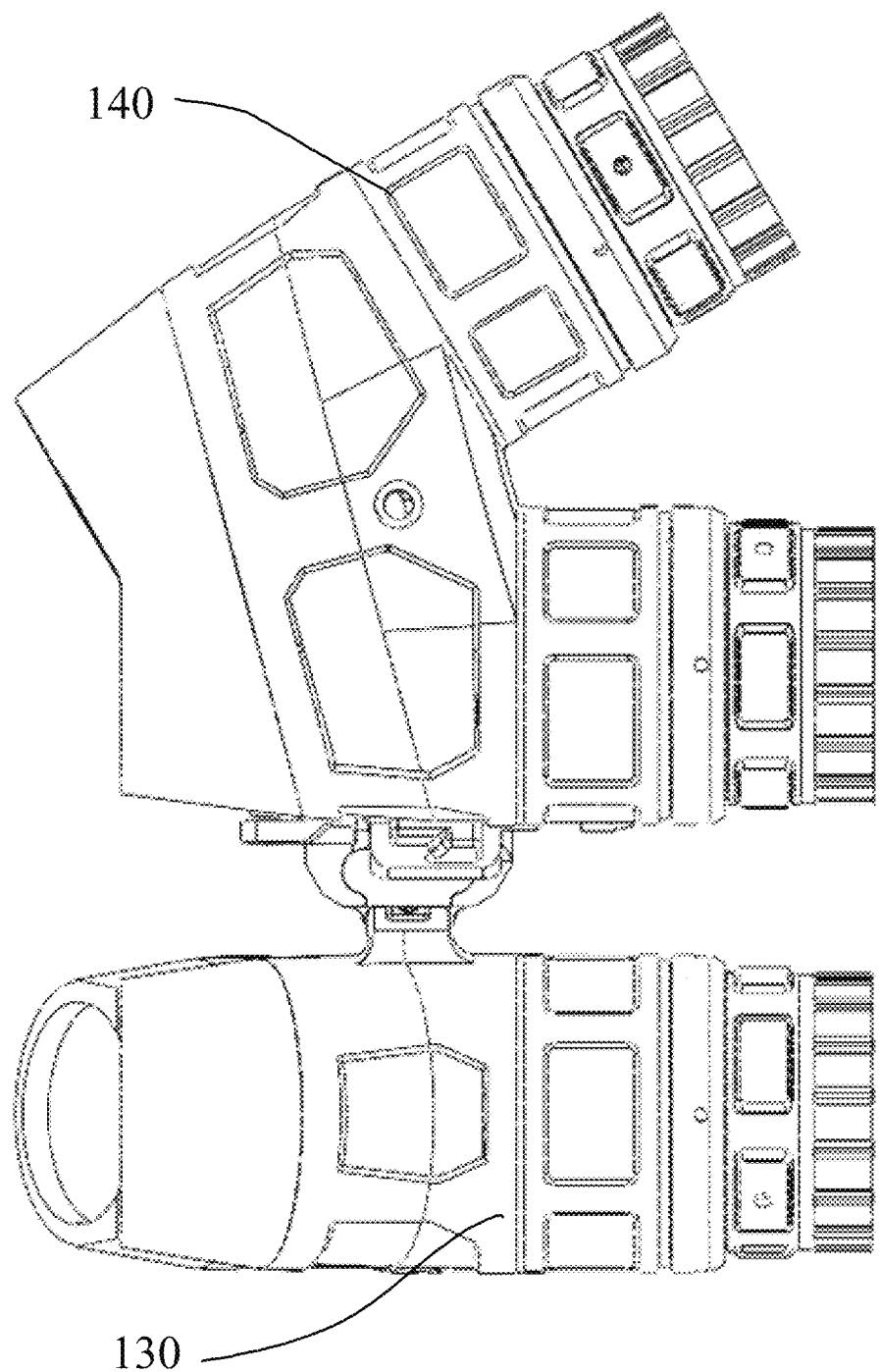
FIG. 10 is a side view of an embodiment of the present panoramic night vision system with one tube subassembly deployed and one tube subassembly stowed.
Figure 11:
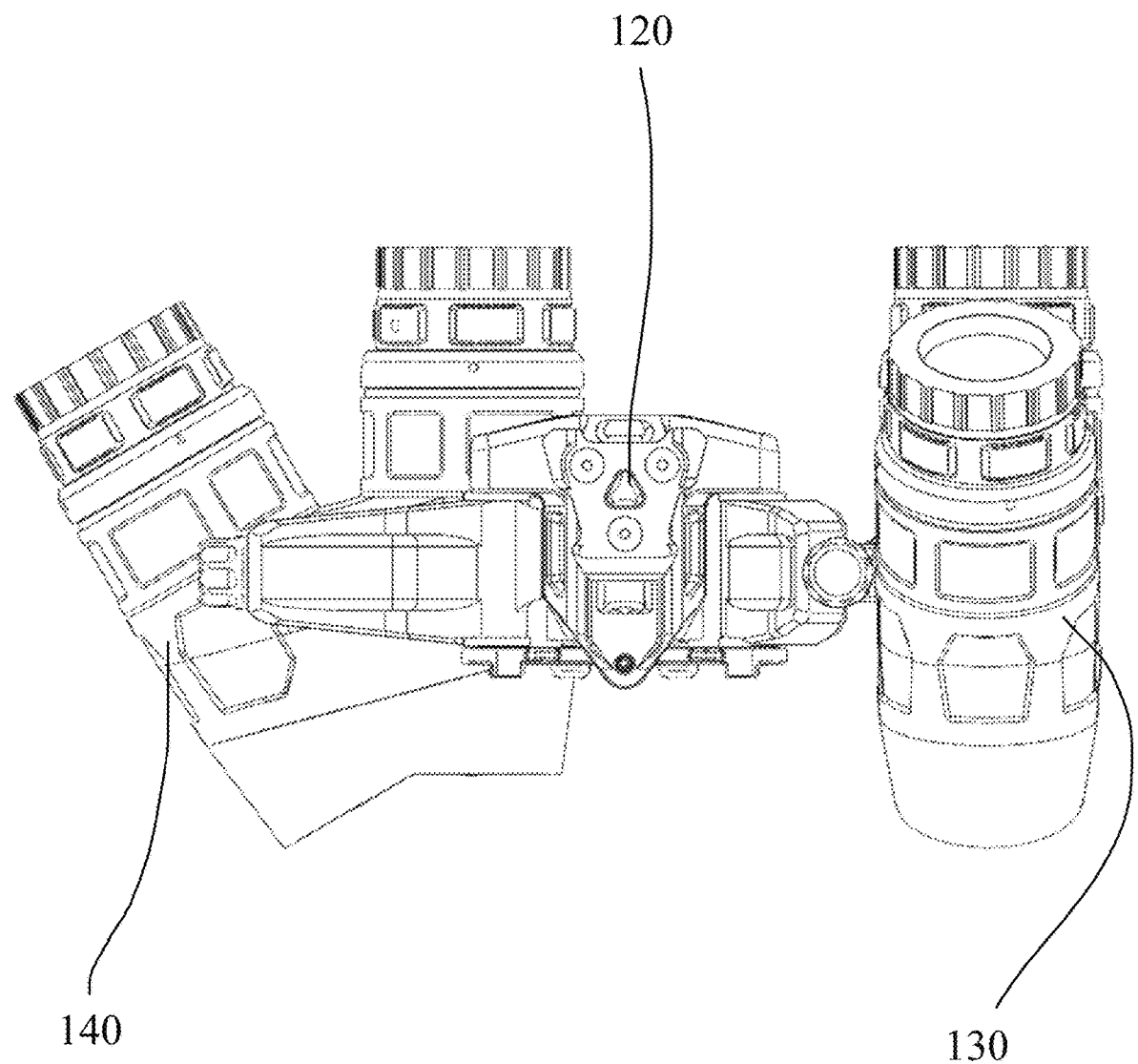
FIG. 11 is a top perspective view of an embodiment of the present panoramic night vision system with one tube subassembly deployed and one tube subassembly stowed.

Instead, as shown in FIGS. 3 and 4, the present panoramic night vision system includes an articulating bridge system comprising two independent arms 100, 110, each with a mounting plate. Each of the arms 100, 110 may be rotated or rotatably attached to a bridge body 120 via a hinge 102 or 112. The hinges 102 and 112 may rotate the tube assembly laterally, or from their sides, such as from sides 130 and 140. During rotation of the hinges 102, 112, the exterior sides 130, 140 are rotated closer to the center line of the panoramic system. In operation, the articulating bridge system may be attached to a user's helmet via the familiar helmet mount 120. However, due to the configuration and assembly shown in FIGS. 3 and 4, the user is provided with a night vision system that provides multiple advantages over the prior art.

First, the articulating bridge system and related assembly permits either subassembly of tubes to be rotated out of a user's view, without the need to rotate both subassemblies at the same time. This allows a user to use only one subassembly while having the other subassembly stowed. FIGS. 5 through 11 illustrate various views of exemplary configurations wherein only one subassembly is stowed, which is enabled by the configuration and assembly of the present articulating bridge system and related panoramic system.

Figure 12:
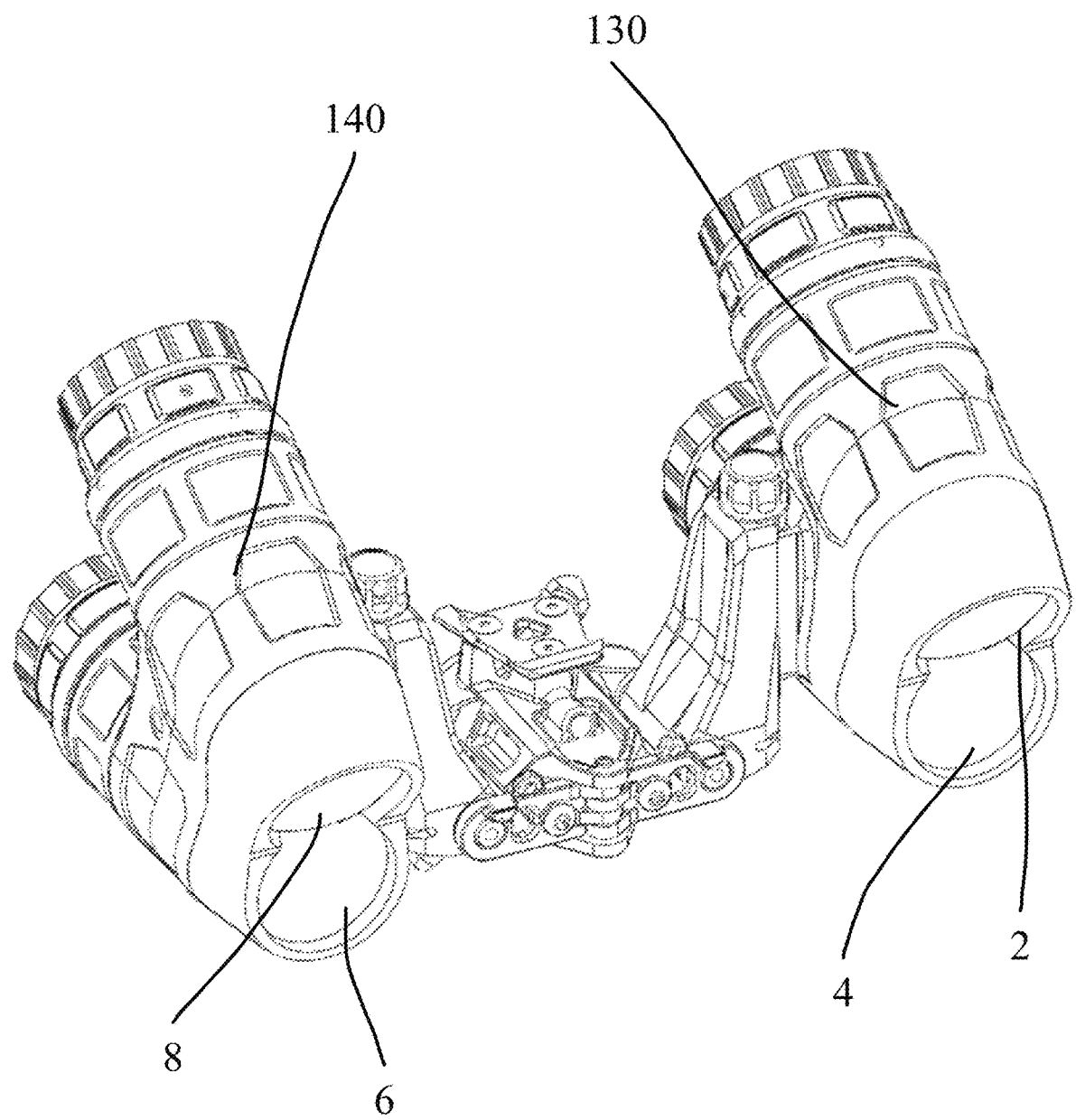
FIG. 12 is a rear perspective view of an embodiment of the present panoramic night vision system with both tube subassemblies stowed.
Figure 13:
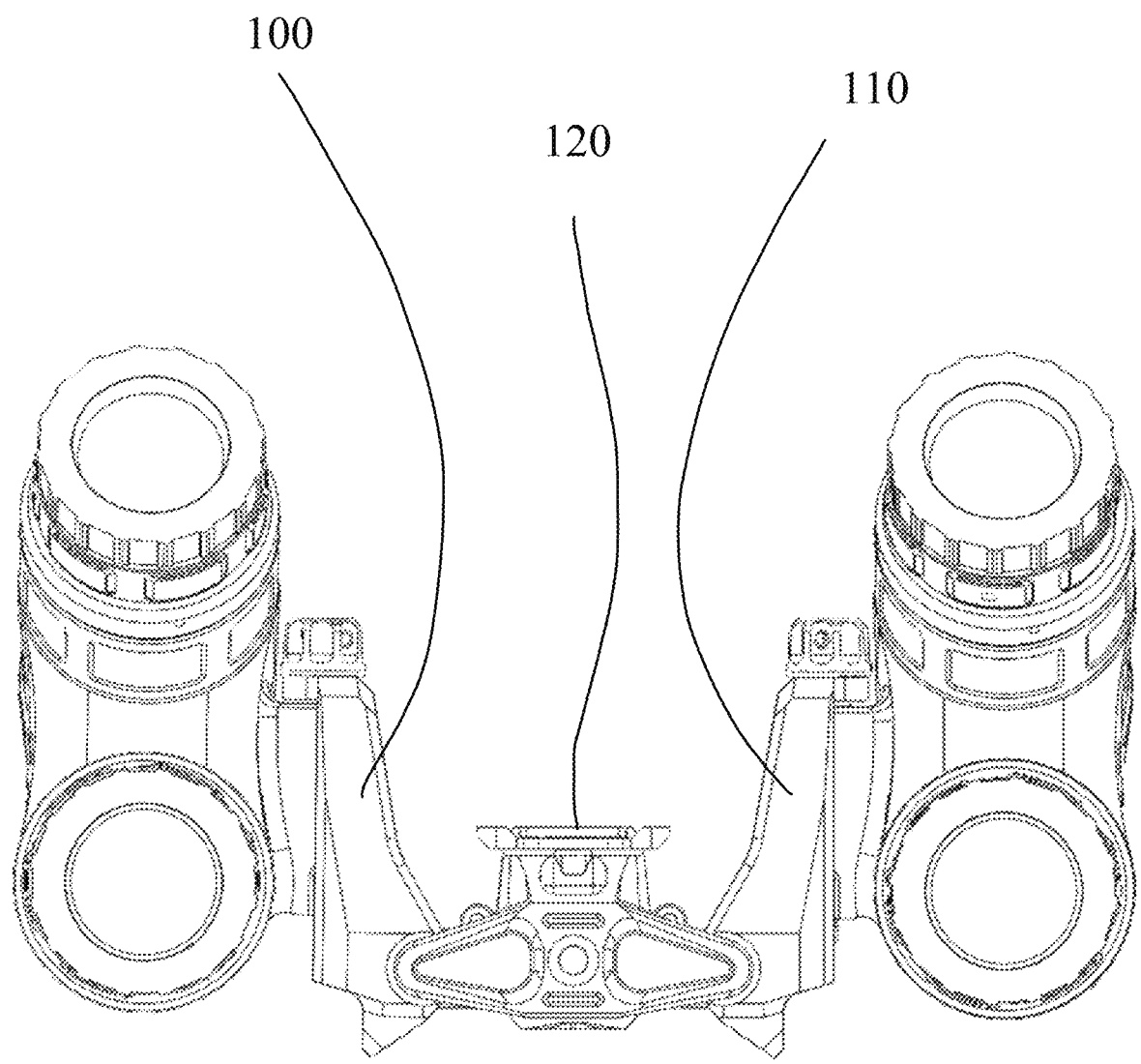
FIG. 13 is a front view of an embodiment of the present panoramic night vision system with both tube subassemblies stowed.
Figure 14:
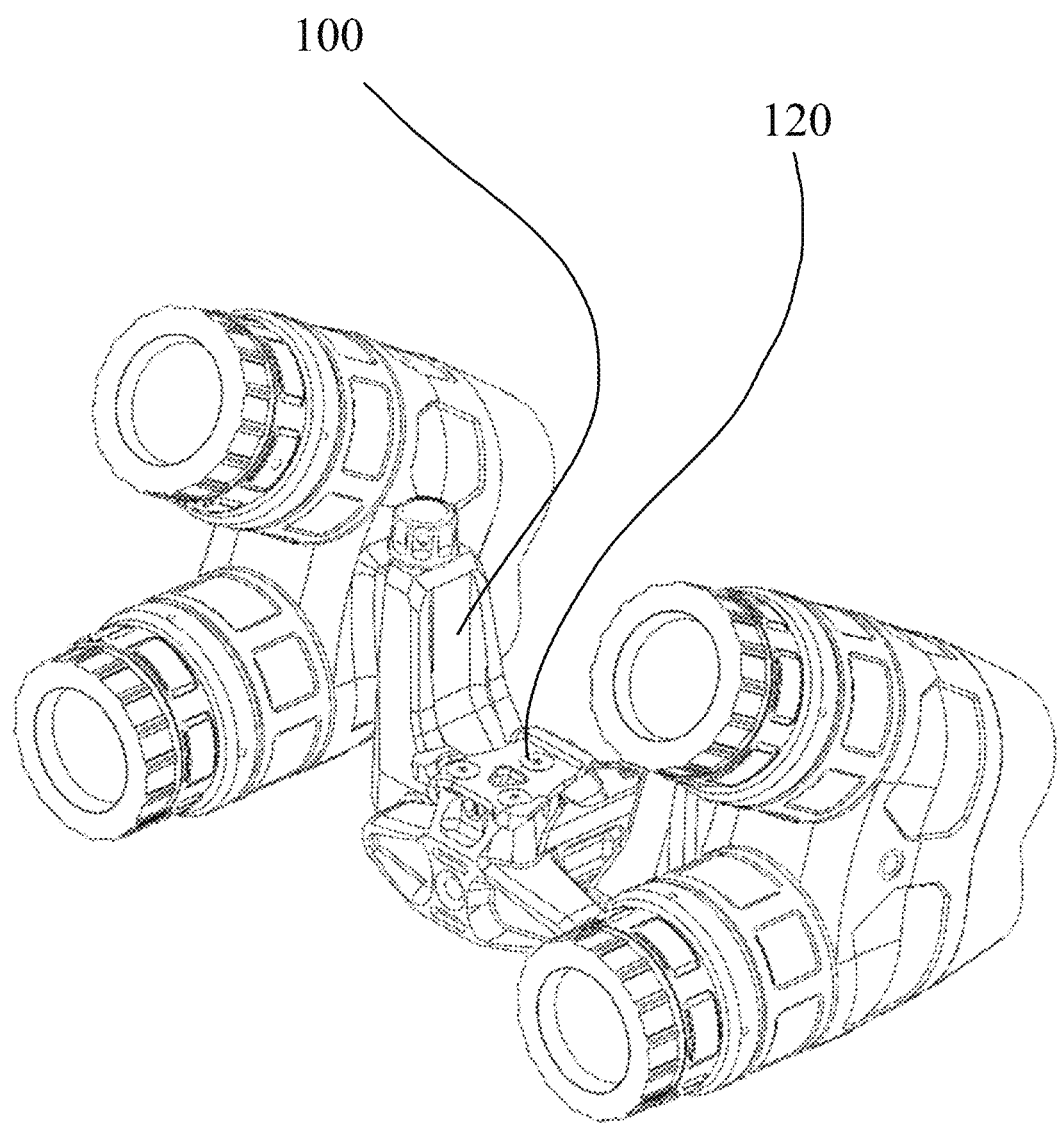
FIG. 14 is a front perspective view of an embodiment of the present panoramic night vision system with both tube subassemblies stowed.
Figure 15:
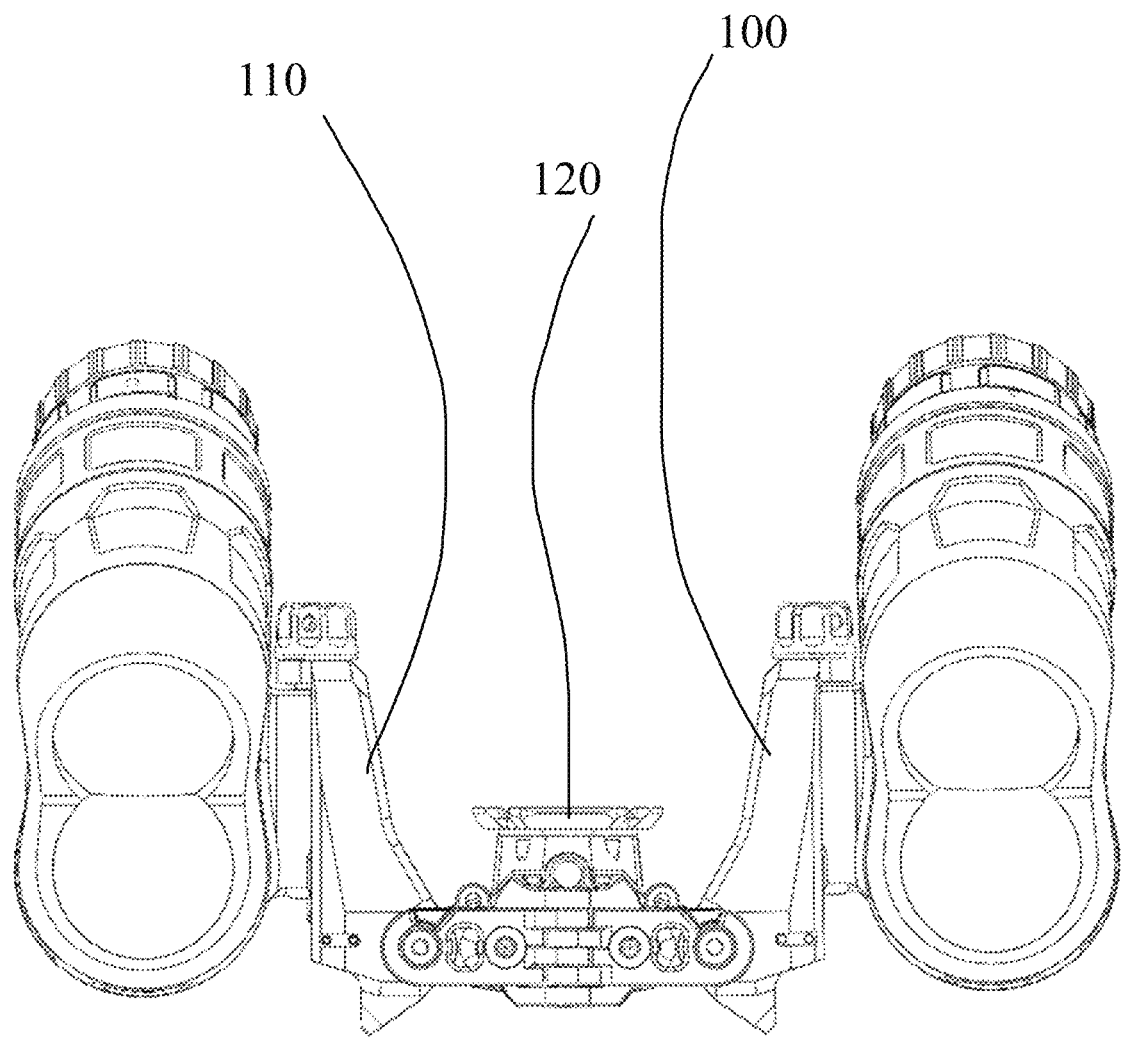
FIG. 15 is a rear view of an embodiment of the present panoramic night vision system with both tube subassemblies stowed.
Figure 16:
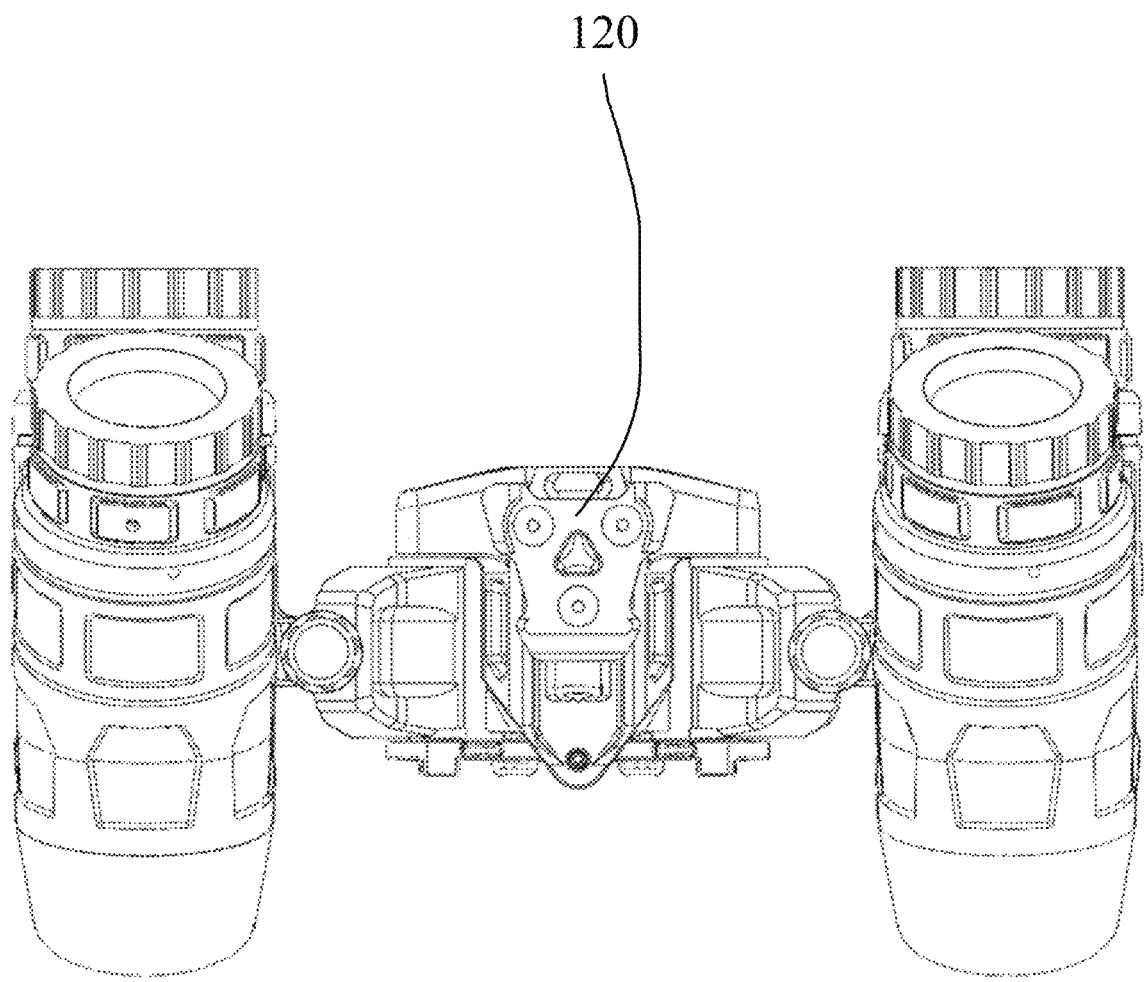
FIG. 16 is a top view of an embodiment of the present panoramic night vision system with both tube subassemblies stowed.
Figure 17:
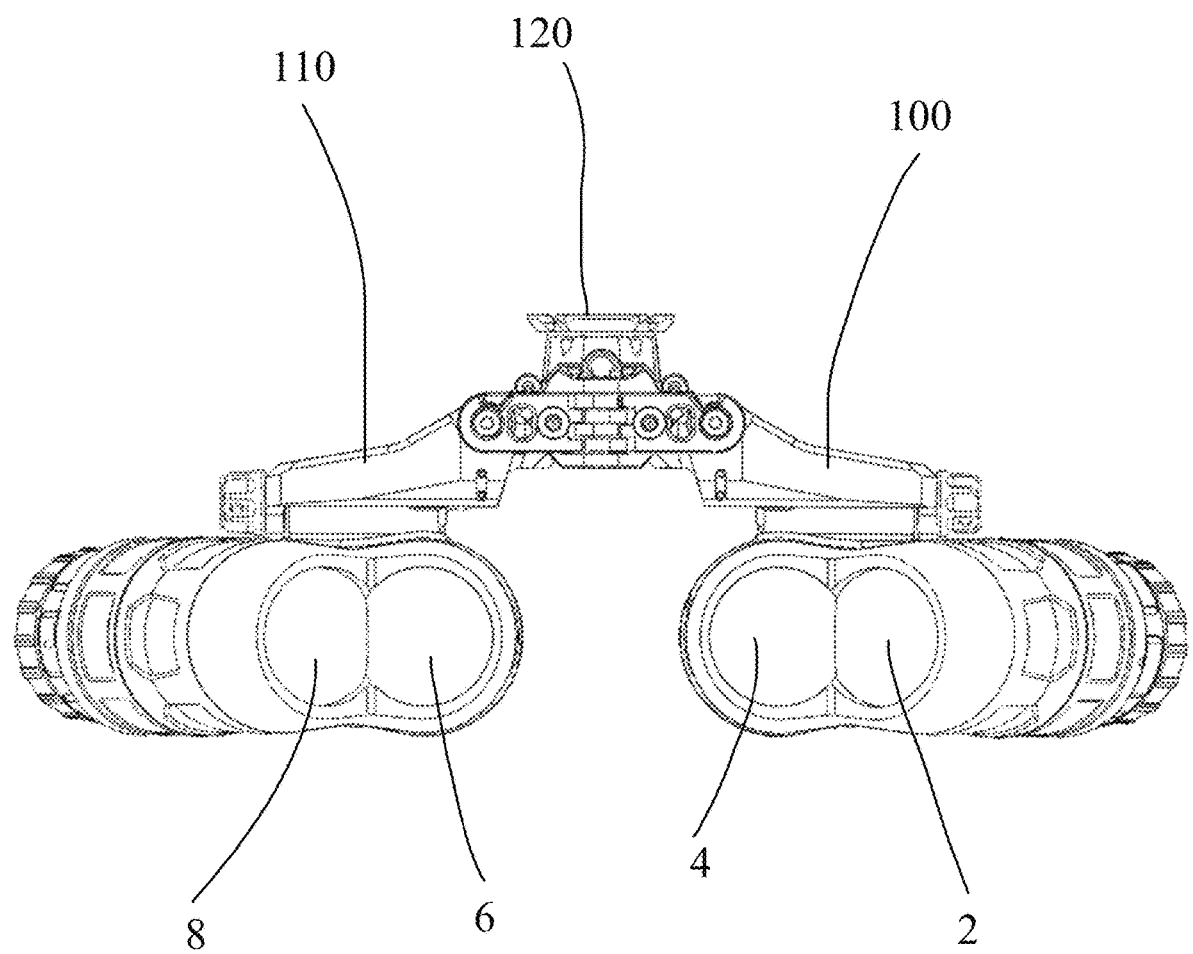
FIG. 17 is a rear view of an embodiment of the present panoramic night vision system with both tube subassemblies deployed.
Figure 18:
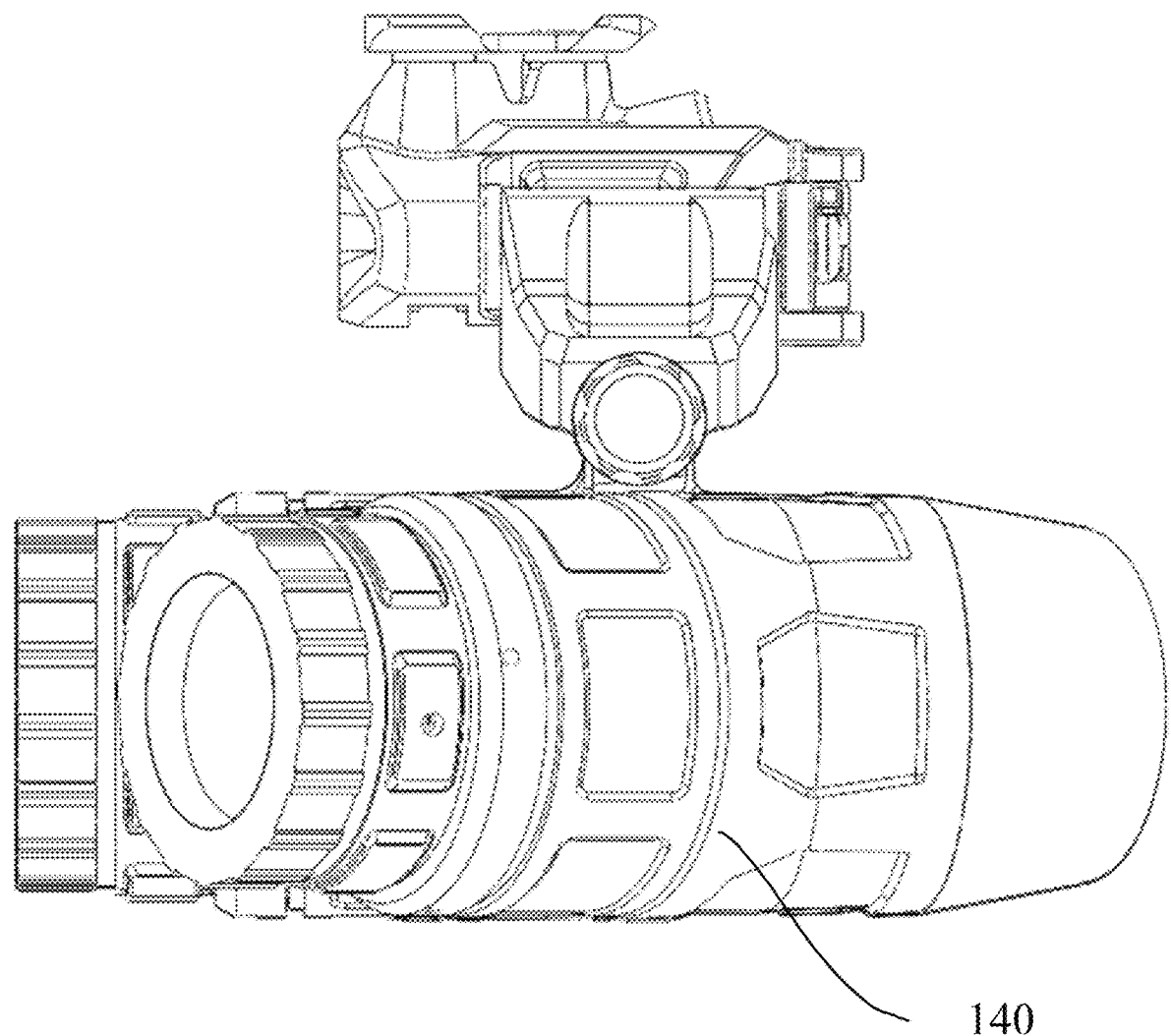
FIG. 18 is a side view of an embodiment of the present panoramic night vision system with both tube subassemblies deployed.
Figure 19:
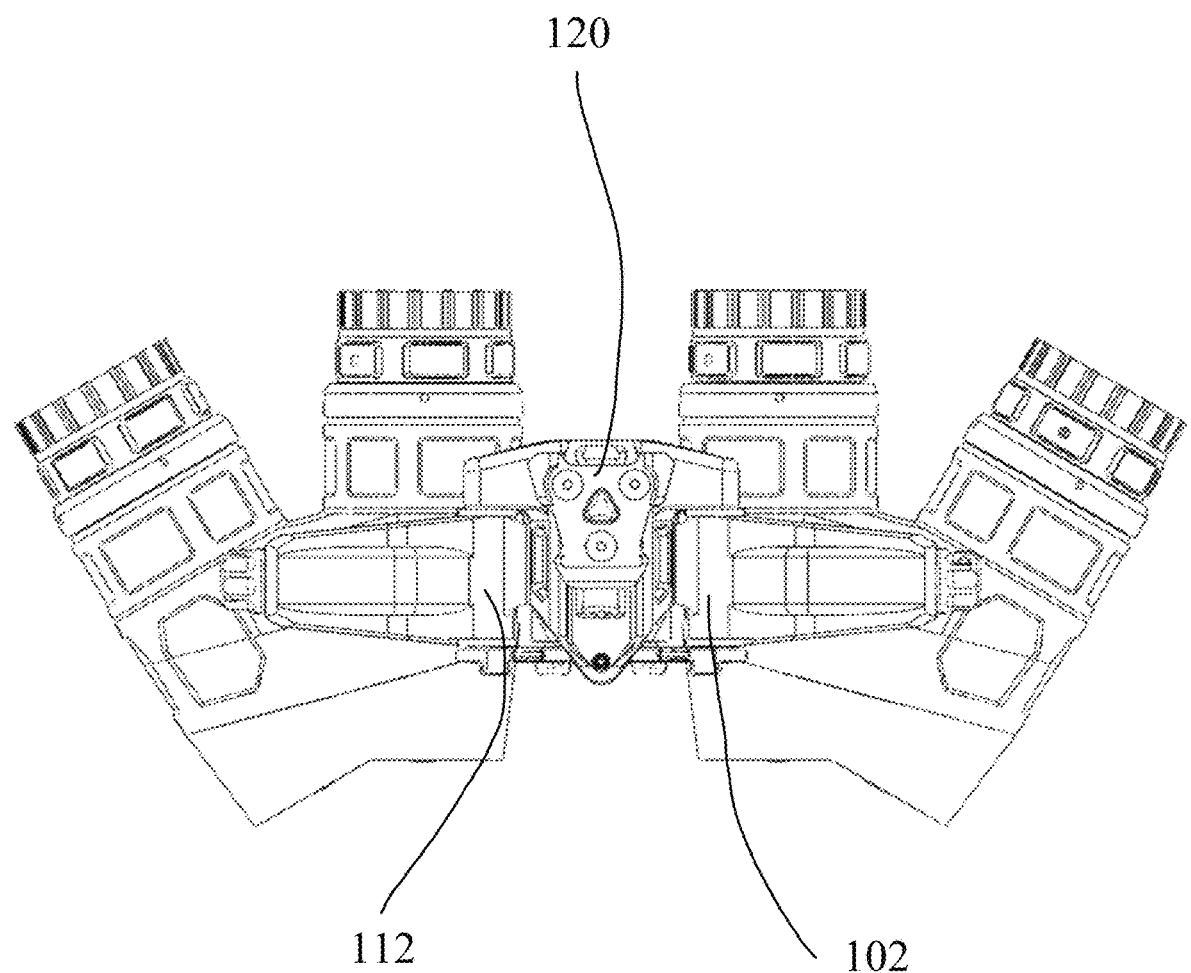
FIG. 19 is a top view of an embodiment of the present panoramic night vision system with both tube subassemblies deployed.
Figure 20:
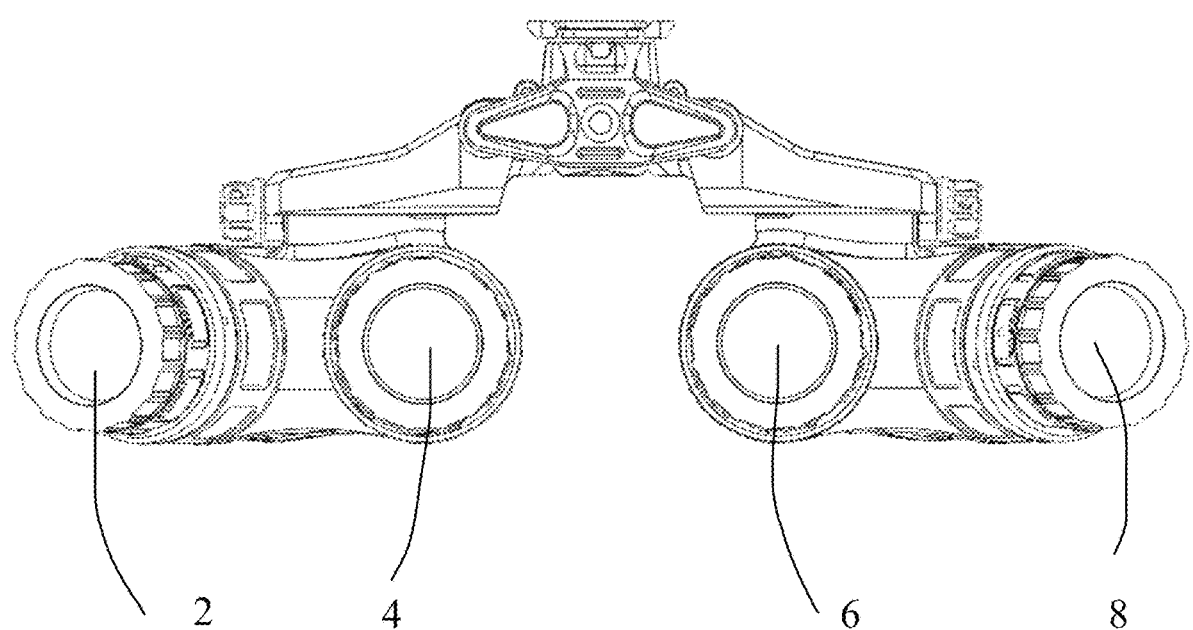
FIG. 20 is a front view of an embodiment of the present panoramic night vision system with both tube subassemblies deployed.
Figure 21:
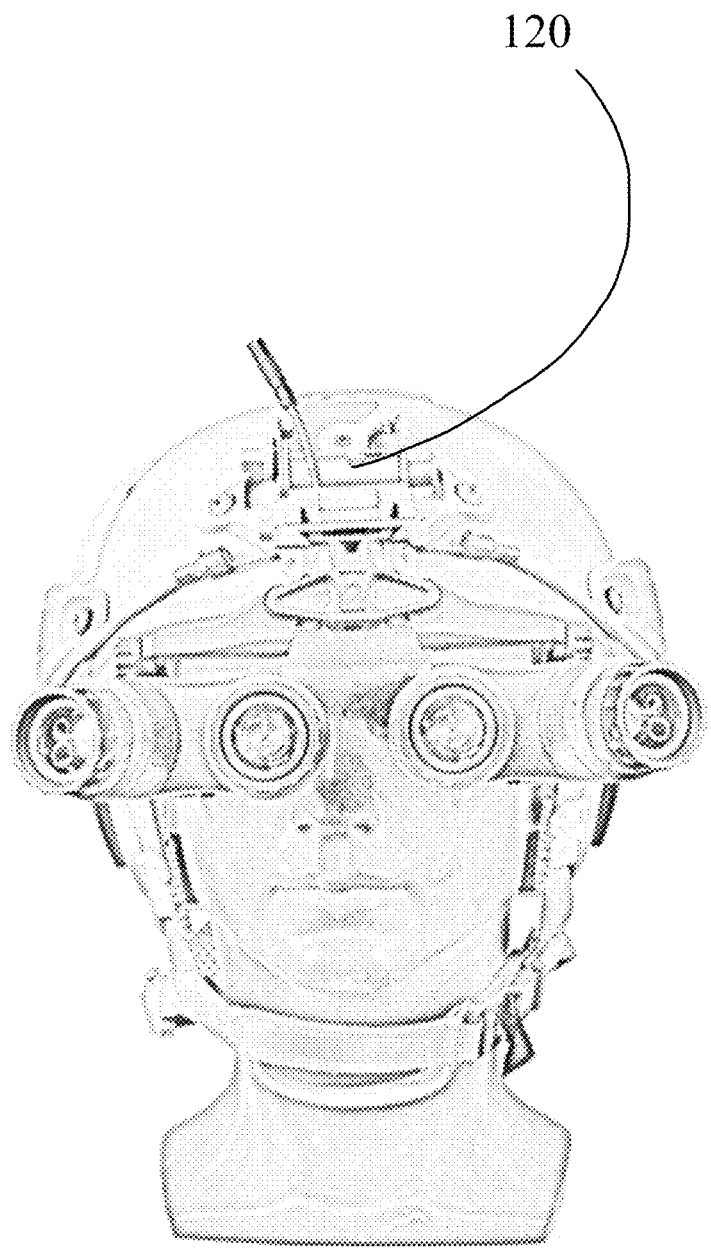
FIG. 21 is a front perspective view of an embodiment of the present panoramic night vision system on a user's helmet with both tube subassemblies deployed.
Figure 22:
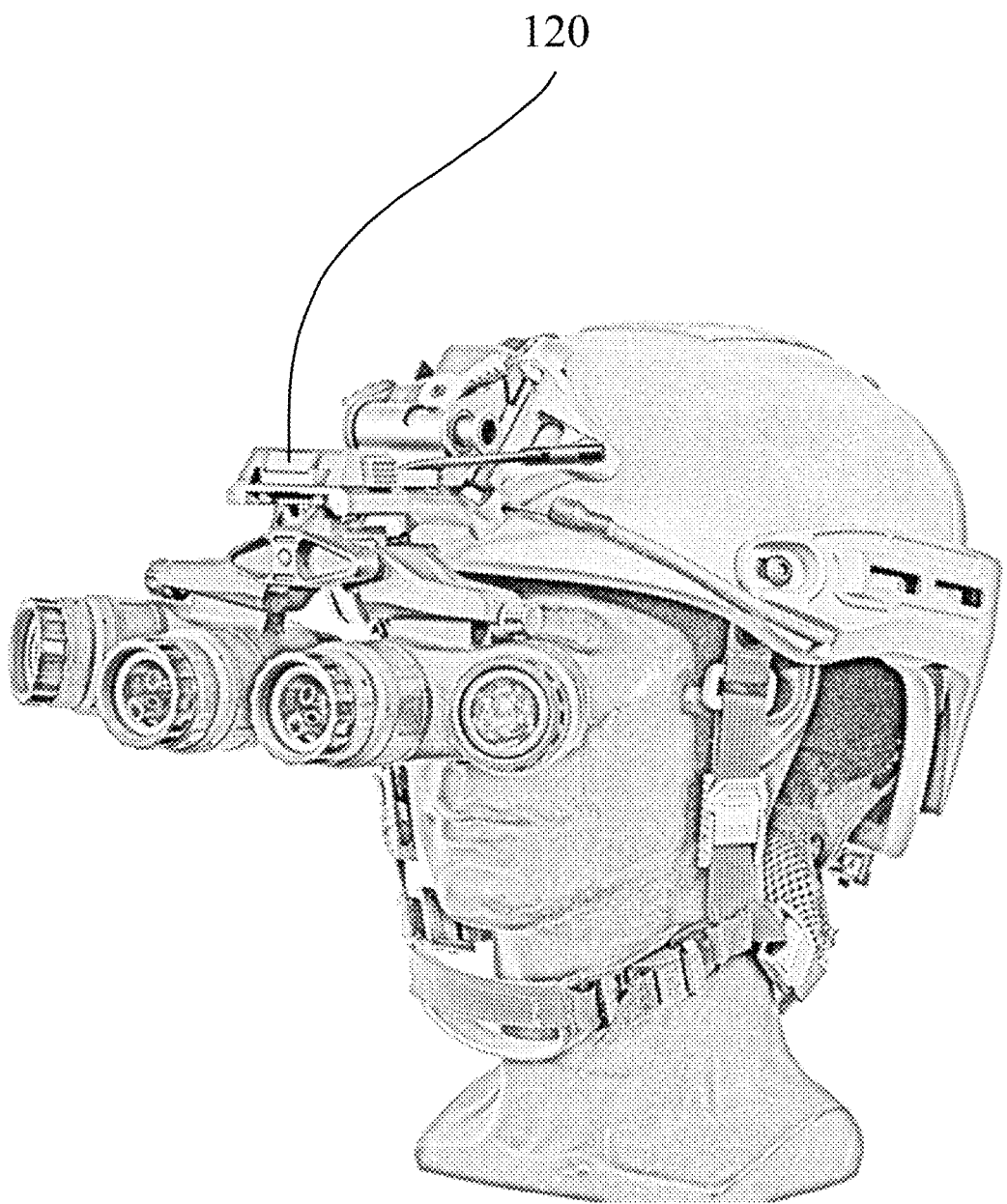
FIG. 22 is a front and side perspective view of an embodiment of the present panoramic night vision system on a user's helmet with both tube subassemblies deployed.
Figure 23:
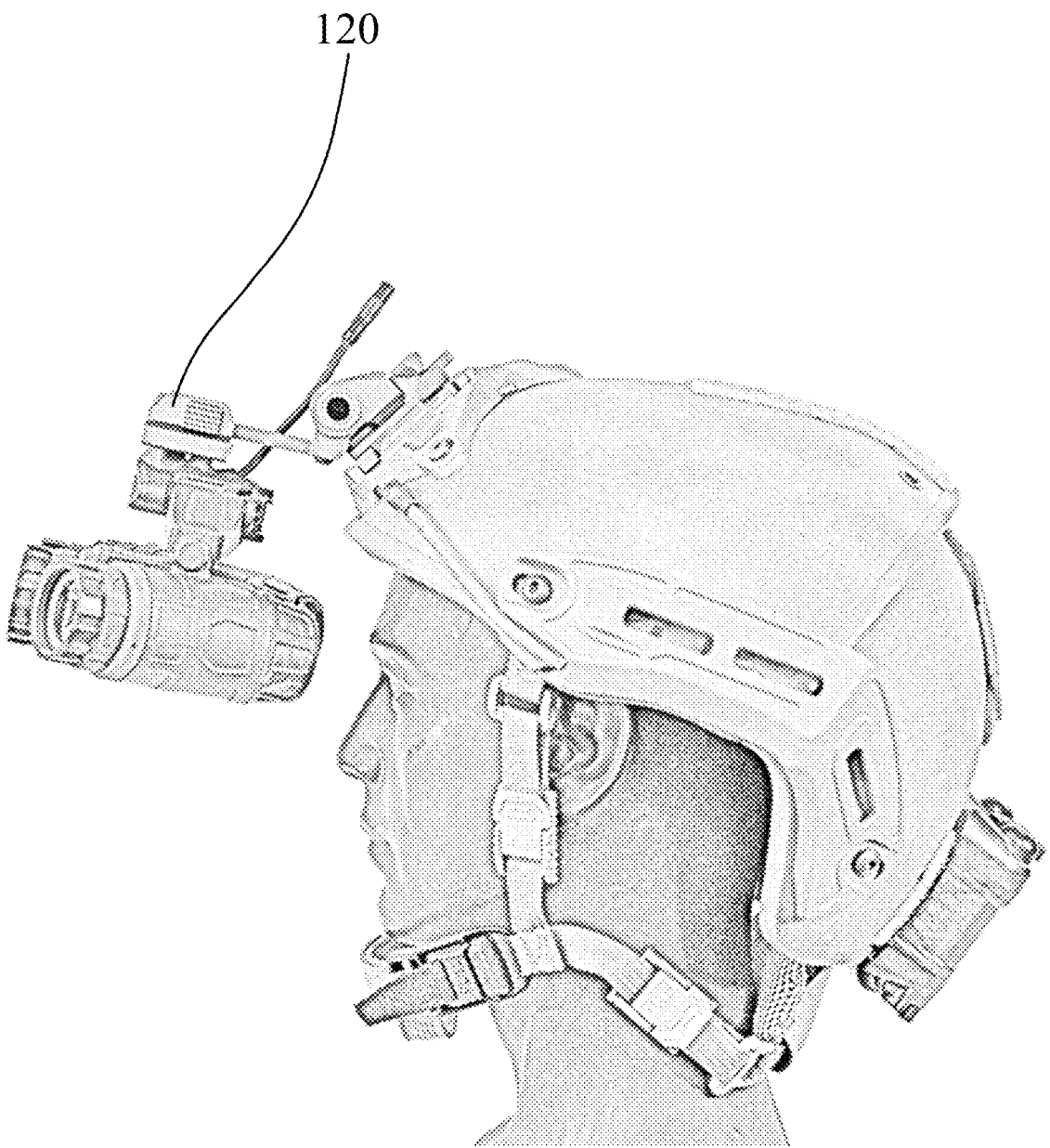
FIG. 23 is a side perspective view of an embodiment of the present panoramic night vision system on a user's helmet with both tube subassemblies deployed.

A second advantage is described with reference to FIG. 12. Specifically, the hinges 102 and 112 are disposed within the panoramic night vision system such that the axis of rotation of each hinge is parallel to the viewing path of the left central image tube 4 and right central image tube 6, respectively. As a result of utilizing two hinges with this type of axis of rotation, in their stowed configuration, such as that shown in FIG. 12, the tubes 2,4 and 6,8 are disposed vertically from one another. This is differentiated from the tube disposition in a deployed status (such as shown in FIG. 3), wherein the tubes are disposed laterally from one another. As a result of the articulating bridge system and related panoramic system stowing the tubes 2, 4, 6, and 8 in this way, in the stowed position, the eyepieces of the various tubes remain facing the user's face, which is distinct from the prior art, where the tubes face the ground and the sky. Stowing the tubes in this way prevents mud, debris, and precipitation from building up on either end of the tube while being stowed, which would require further action from the user (e.g. washing, drying, or wiping) prior to being able to deploy and view through the panoramic system. With the present configuration, any such debris or precipitation would fall and collect on the outer surfaces of the tubes, which means that the viewing path would remain unobstructed. FIGS. 13 through 16 show various views of the first stowed configuration, wherein the tubes remain disposed longitudinally to the user's view. The articulating bridge system permits quick and easy transition to the deployed configuration, as shown in the various views of FIGS. 17 through 23.

Figure 24:
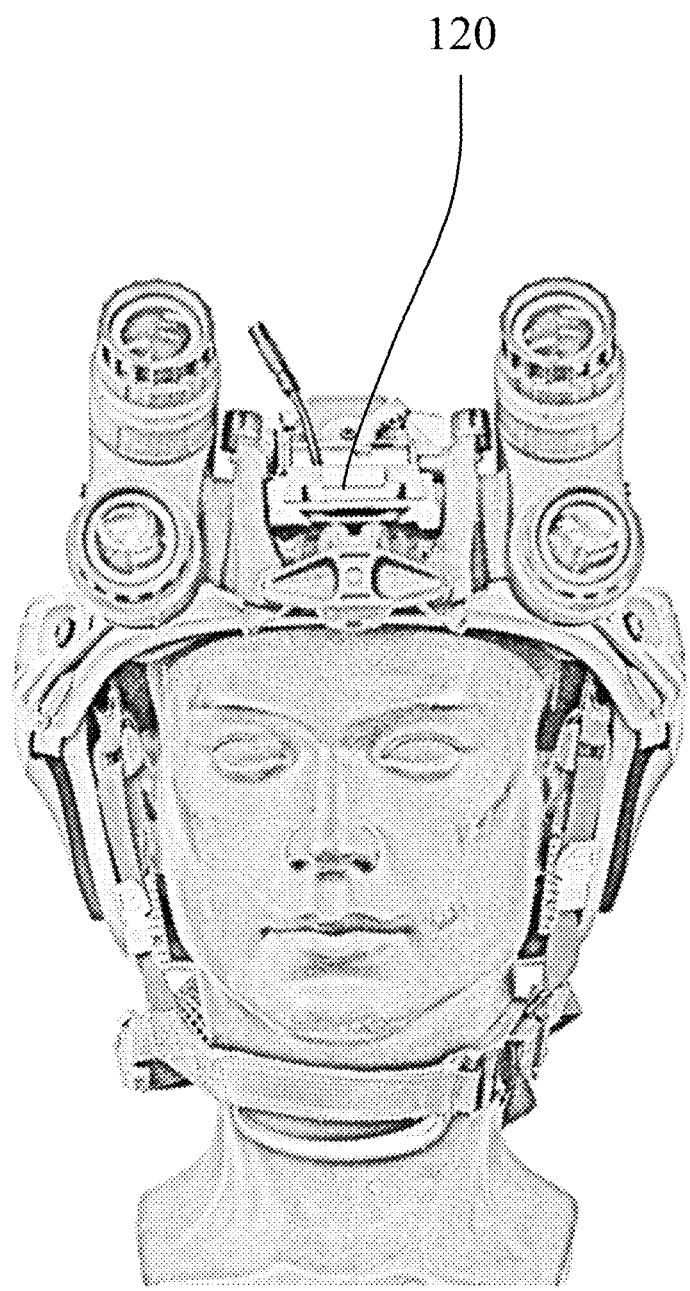
FIG. 24 is a front perspective view of an embodiment of the present panoramic night vision system on a user's helmet with both tube subassemblies stowed in a first position.
Figure 25:
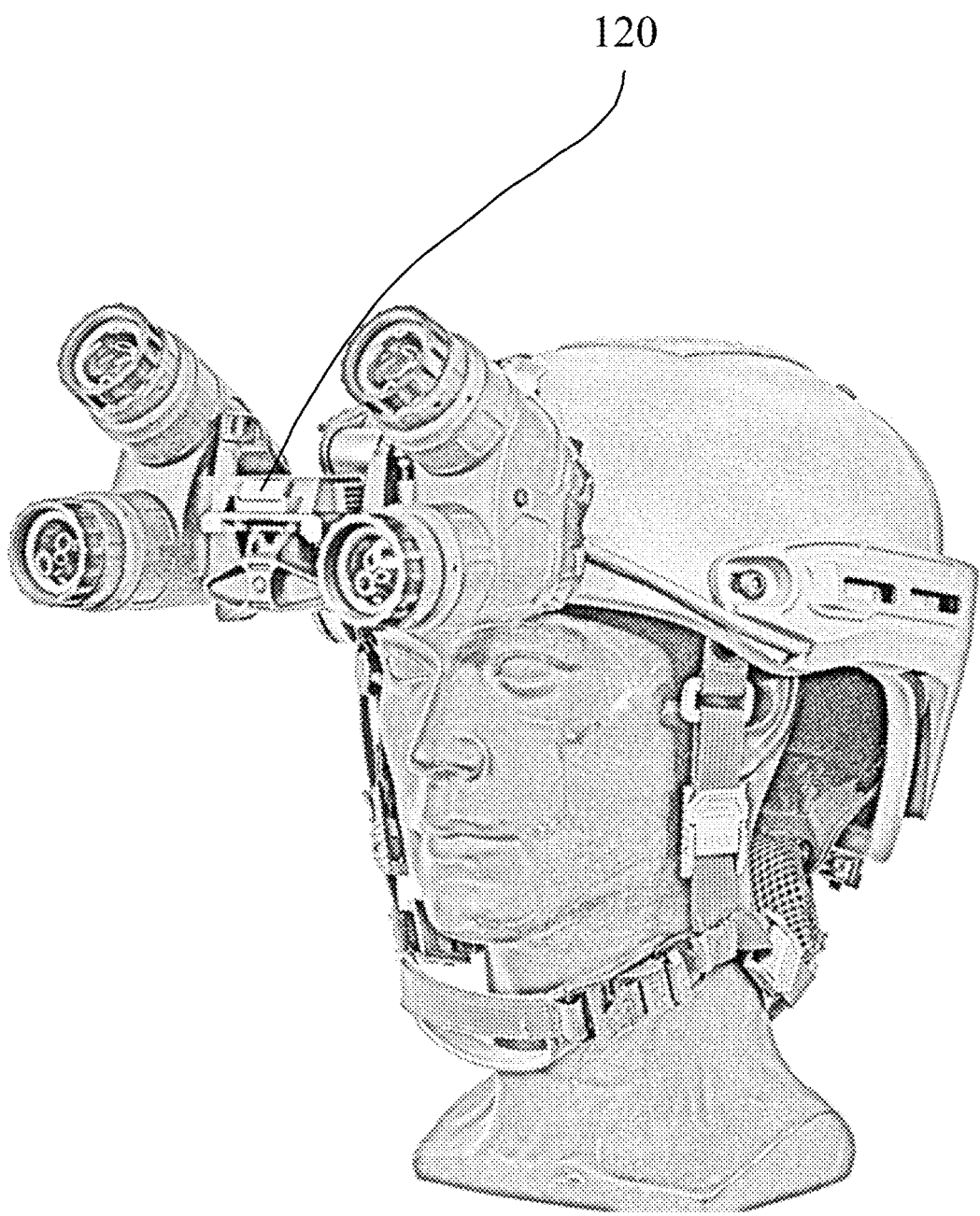
FIG. 25 is a front and side perspective view of an embodiment of the present panoramic night vision system on a user's helmet with both tube subassemblies stowed in a first position.
Figure 26:
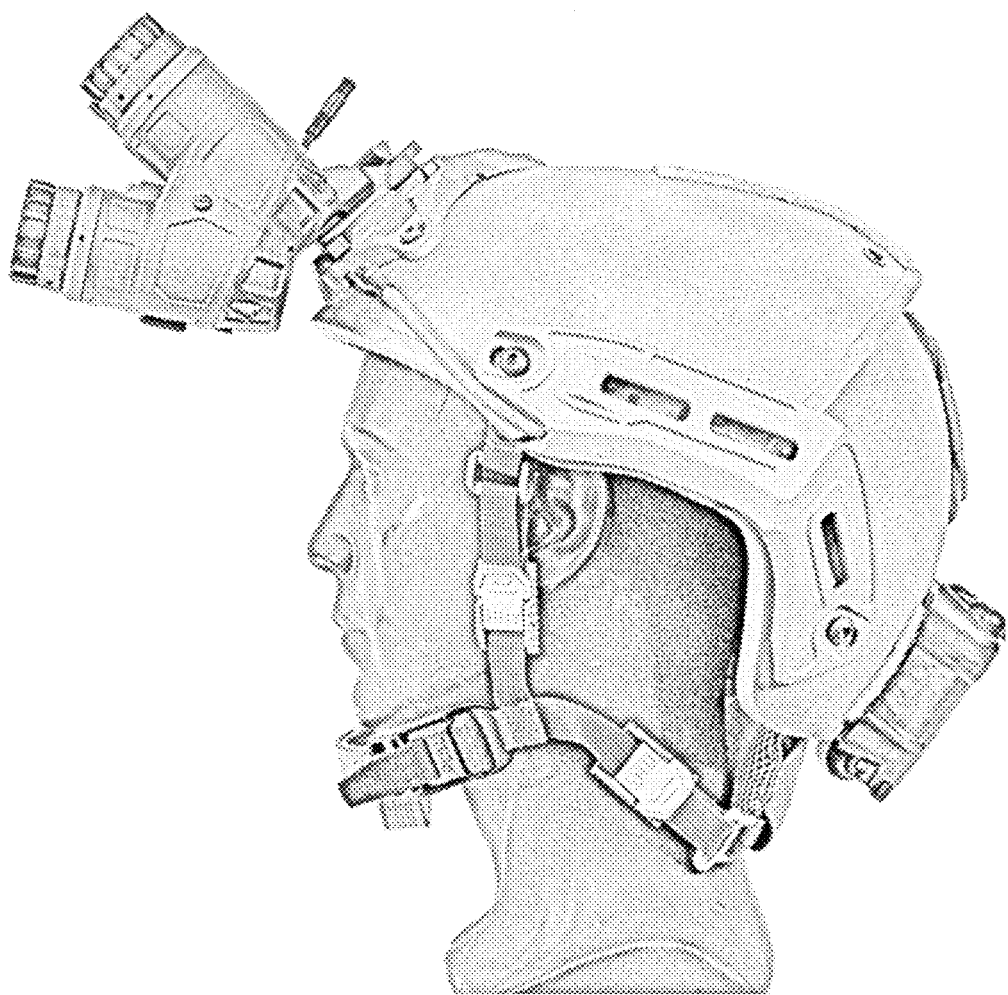
FIG. 26 is a side perspective view of an embodiment of the present panoramic night vision system on a user's helmet with both tube subassemblies stowed in a first position.

Third, as shown by comparing FIGS. 24 through 26 to FIGS. 27 through 32, the articulating bridge system of the present panoramic system provides a first stowed position of FIGS. 24 and 26, with the tube subassemblies facing forward and stowed substantially in front of the user's helmet. In this configuration, the tubes 2,4, 6, and 8 retain their longest length/axis in the longitudinal axis consistent with the user's view (as opposed to pointing that length/axis upward). As a result, this first stowed configuration does not add height to the user, permitting continued mobility in low-height scenarios, such as urban or man-made structures, or in vehicles. User's can traverse doors with greater clearance and maneuver without fear of hitting the environment above their helmet.

Figure 27:
FIG. 27 is a front perspective view of an embodiment of the present panoramic night vision system on a user's helmet with both tube subassemblies stowed in a second position.
Figure 28:
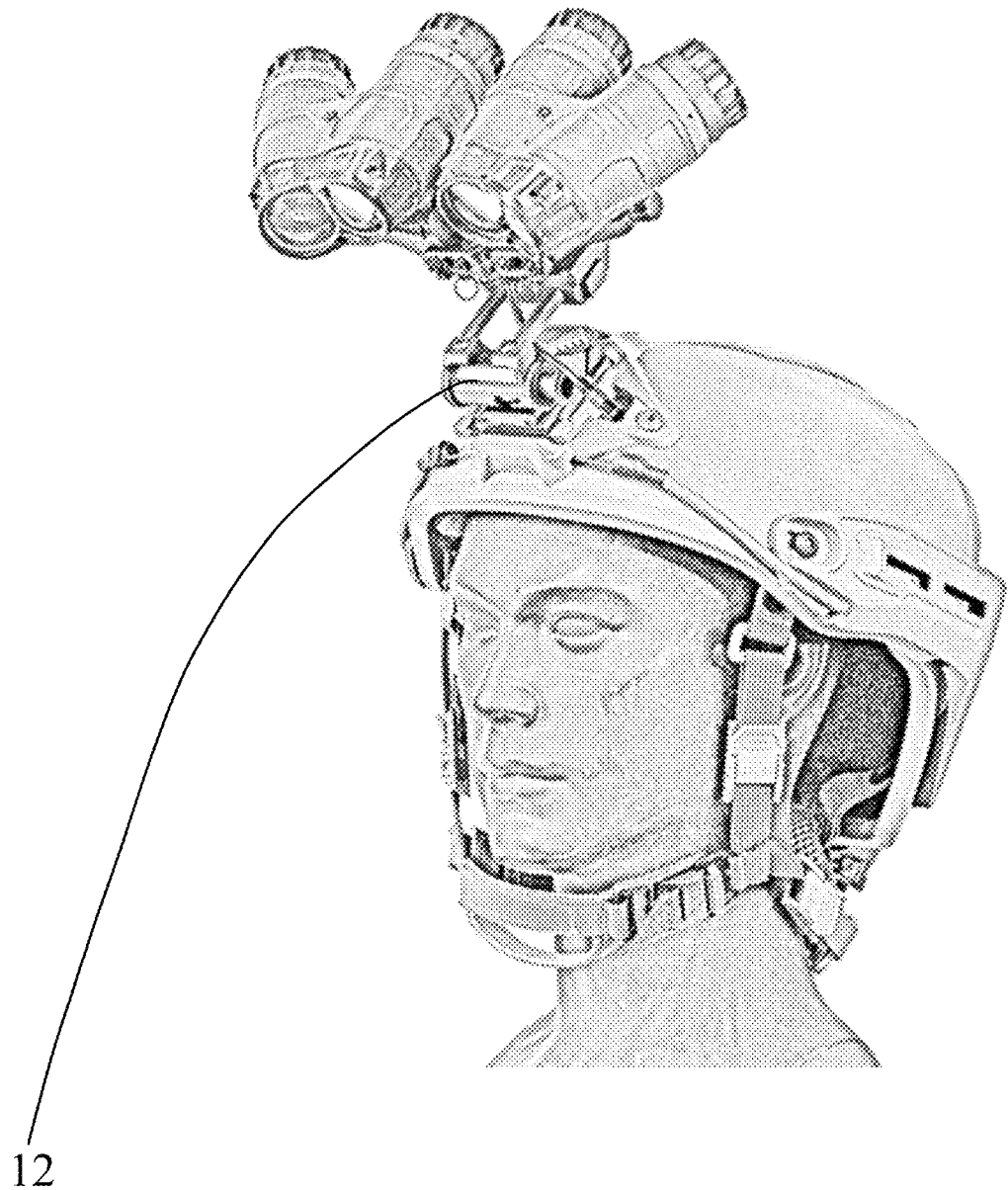
FIG. 28 is a front and side perspective view of an embodiment of the present panoramic night vision system on a user's helmet with both tube subassemblies stowed in a second position.
Figure 29:
FIG. 29 is a side perspective view of an embodiment of the present panoramic night vision system on a user's helmet with both tube subassemblies stowed in a second position.
Figure 30:
FIG. 30 is a front perspective view of an embodiment of the present panoramic night vision system on a user's helmet with both tube subassemblies stowed in a third position.
Figure 31:
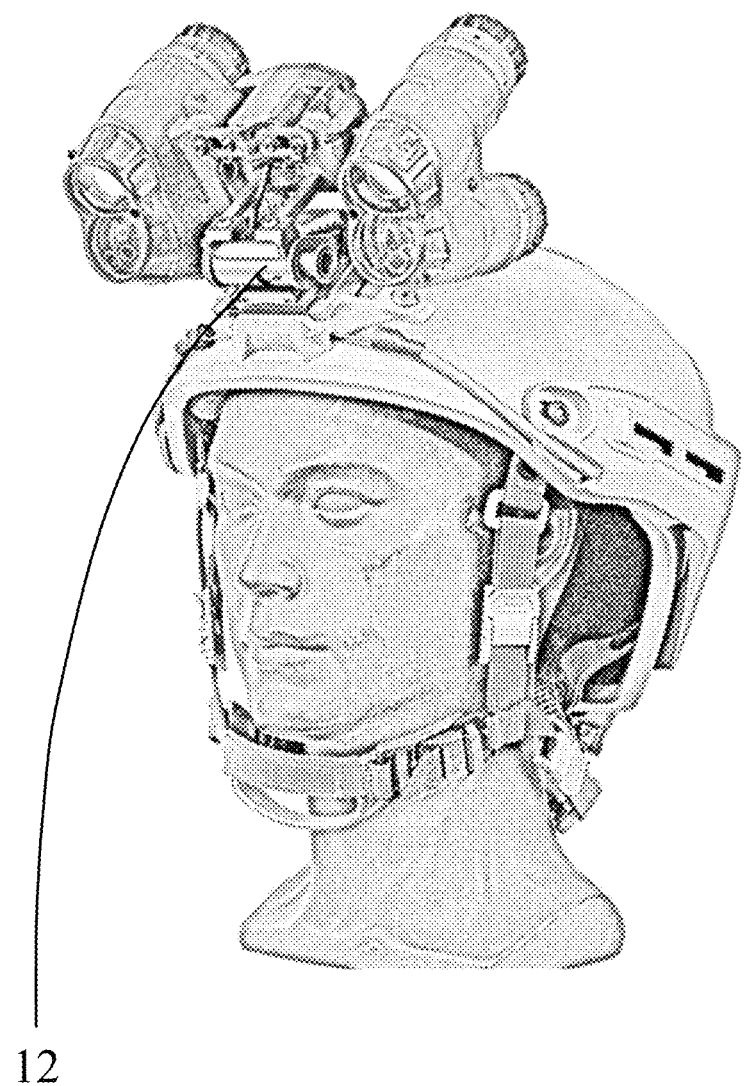
FIG. 31 is a front and side perspective view of an embodiment of the present panoramic night vision system on a user's helmet with both tube subassemblies stowed in a third position.
Figure 32:
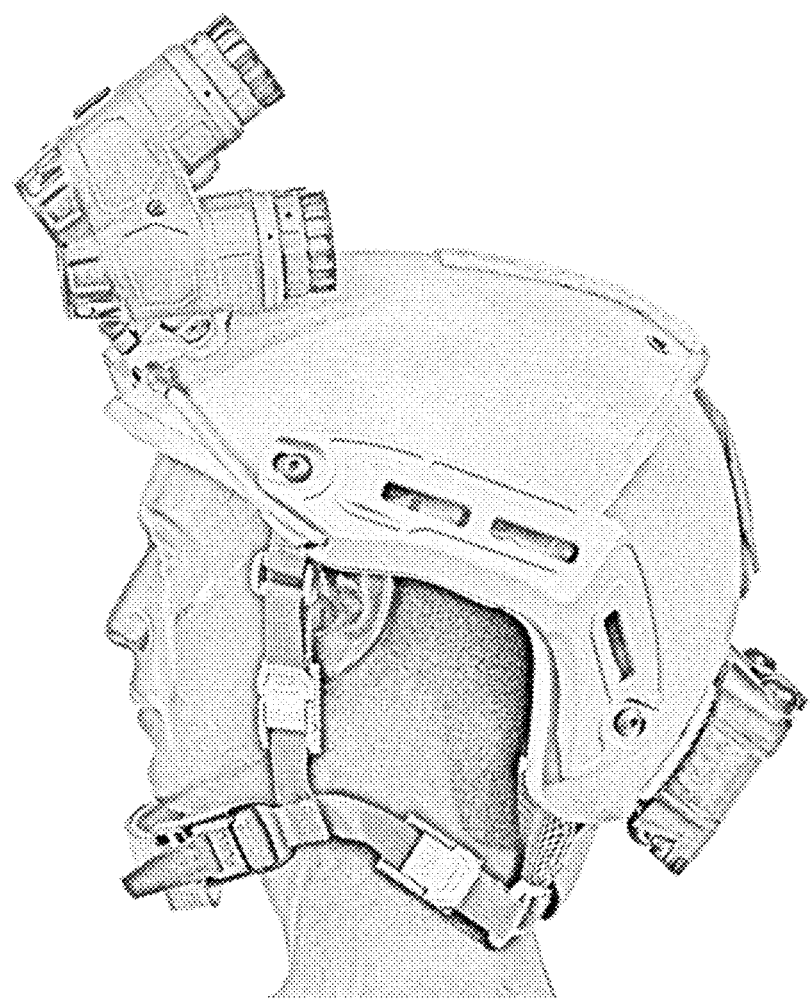
FIG. 32 is a side perspective view of an embodiment of the present panoramic night vision system on a user's helmet with both tube subassemblies stowed in a third position.

Fourth, as shown in the views of FIGS. 27 through 29, the articulating bridge system of the present disclosure may be used with a traditional helmet mount 12 to provide a second stowed position. When used with the traditional helmet mount, the subassemblies may be stowed in a second position above the helmet, with the tube length/axis partially pointing to the ground and sky. As shown in the views of FIGS. 30 through 32, the combination of the present articulating bridge system and helmet mount 12 provides a third stowed position. The stowing of the panoramic tubes in the manner shown in FIGS. 30 through 32 causes the tubes to be positioned with the mass and the center of gravity located closer to the natural pivot point of the neck. The placement of the mass of the system in this way is more comfortable for users because it reduces user neck strain and increases user experience. Thus, the present panoramic system is advantageous over prior systems that do not have an articulating bridge system and may therefore strain a user's neck or back.

Most importantly, the configurations described herein do not cause a noticeable negative effect on the use of the panoramic night vision system. FIGS. 17 through 23 show various views of the deployed configuration used in the panoramic system. A user would need to make two rotation actions from the first stowed position to the deployed position, which may require two-handed operation, or successive one-handed operations. However, given the increased flexibility, additional safekeeping of the system, and other advantages, at least as described herein, this differentiation is a very minor difference made in exchange for the many benefits that are not seen in the prior art.

It is believed that the articulating bridge system shown and described herein is desirable and provides substantial improvement over the panoramic night vision systems shown in the prior art. Those improvements and advantages include those specifically shown or described in this disclosure, and those improvements and advantages that one skilled in the art would appreciate with notice of the aforementioned articulating bridge system.

Embodiments described herein may be combined in a novel and inventive way to provide advantages that were not previously observed in the art. This disclosure should not necessarily be interpreted to be limited to only the embodiments shown and described, as embodiments described may appear differently than as shown, and drawings shown may be understood differently than as described.

We claim:

1. A panoramic night vision system comprising:
   a first tube subassembly comprising a first tube and a second tube, the first tube subassembly having an outer side;
   a second tube subassembly comprising a third tube and a fourth tube, the second tube subassembly having an outer side;
   an articulating bridge system comprising:
      a bridge body comprising a mounting point;
      a first arm comprising amounting plate coupled to the first tube subassembly;
      a second arm comprising a mounting plate coupled to the second tube subassembly;
      a first hinge rotatably coupling the bridge body to the first arm and configured to rotate the first tube subassembly from its outer side; and
      a second hinge rotatably coupling the bridge body to the second arm and configured to rotate the second tube subassembly from its outer side,
      wherein the first arm and the second arm are configurable between a first mutually deployed position, a second mutually stowed position, and a third position with the first tube subassembly stowed and the second tube subassembly deployed;
      wherein, in the first position, the orientation of the first arm and the orientation of the second arm are disposed along the same horizontal plane;
      wherein, in the second position, the orientation of the first arm and the orientation of the second arm are disposed substantially parallel to each other; and
      wherein, in the third position, the orientation of the first arm is disposed substantially perpendicular to the orientation of the second arm.

* * * * *